(12) United States Patent
Honorio Araujo da Silva et al.

(10) Patent No.: US 12,587,357 B2
(45) Date of Patent: Mar. 24, 2026

(54) **METHODS AND SYSTEMS FOR *P*-ADIC ENCODING AND DECODING OF RATIONAL DATA FOR FHE SYSTEMS**

(71) Applicant: Algemetric, Inc., Colorado Springs, CO (US)

(72) Inventors: David W. Honorio Araujo da Silva, Colorado Springs, CO (US); Carlos A. Paz de Araujo, Colorado Springs, CO (US); Luke E. Harmon, Colorado Springs, CO (US); Gaetan Delavignette, Colorado Springs, CO (US); Arnab Roy, Vienna (AT)

(73) Assignee: Algemetric, Inc., Colorado Springs, CO (US)

( * ) Notice: Subject to any disclaimer, the term of this patent is extended or adjusted under 35 U.S.C. 154(b) by 135 days.

(21) Appl. No.: 18/535,875

(22) Filed: Dec. 11, 2023

(65) Prior Publication Data

US 2024/0243899 A1 Jul. 18, 2024

Related U.S. Application Data

(60) Provisional application No. 63/386,700, filed on Dec. 9, 2022.

(51) Int. Cl.
| | |
|---|---|
| *H04L 29/06* | (2006.01) |
| *H04L 9/00* | (2022.01) |
| *H04L 9/30* | (2006.01) |

(52) U.S. Cl.
CPC ............ *H04L 9/008* (2013.01); *H04L 9/3033* (2013.01)

(58) Field of Classification Search
CPC ..... H04L 9/008; H04L 9/3033; H04L 9/3093; H04L 25/493
See application file for complete search history.

(56) References Cited

U.S. PATENT DOCUMENTS

| | | | | |
|---|---|---|---|---|
| 9,906,360 | B2 * | 2/2018 | Johnson | ................ H04L 9/0631 |
| 11,032,061 | B2 * | 6/2021 | Chen | ..................... H04L 9/0631 |

(Continued)

FOREIGN PATENT DOCUMENTS

WO WO2022061184 A2 3/2022

OTHER PUBLICATIONS

Archer et al., "Ramparts: A Programmer-Friendly System for Building Homomorphic Encryption Applications", WAHC'19: Proceedings of the 7th ACM Workshop on Encrypted Computing & Applied Homomorphic Cryptography, pp. 57-68 (Year: 2019).*

(Continued)

*Primary Examiner* — Morshed Mehedi
(74) *Attorney, Agent, or Firm* — Christopher P. Whitham; Cochran Freund & Young LLC

(57) ABSTRACT

Disclosed are methods and systems to provide homomorphic compatible, p-adic arithmetic based encoding and decoding of rational numbers to integers and back to rational numbers for use with existing Fully Homomorphic Encryption (FHE) systems. Embodiments support both Approximate Greatest Common Devisor (AGCD) systems such as those with an Integer—Dijk, Gentry, Halevi, and Vaikuntanathan (IDGHV) scheme, and Ring Learning With Error (RLWE) systems such as a Fan and Vercauteren (FV) scheme modified for encrypting integers (ModFV). Encoded integers are provided to an FHE system on a source device that may optionally deliver the encrypted ciphertext to an intermediary device for performance of homomorphic algebra operations, and, the resultant and/or original ciphertext is delivered to a destination device for decryption of the ciphertext, and decoding of the decrypted integer back to a rational number.

22 Claims, 2 Drawing Sheets

(56) References Cited

U.S. PATENT DOCUMENTS

2019/0394019 A1 * 12/2019 Gao ........................ H04L 9/008
2022/0085973 A1 * 3/2022 Honorio Araujo Da Silva ...........
                                                    H04L 9/3249
2022/0385448 A1 * 12/2022 Honorio Araujo Da Silva ...........
                                                    H04L 9/14

OTHER PUBLICATIONS

International Search Report and Written Opinion of Apr. 2, 2024, PCT Patent Application No. PCT/US2023/083444, Publication No. WO2024/124249.

* cited by examiner

100  BLOCK DIAGRAM OF HARDWARE IMPLEMENTATION FOR AN
       EMBODIMENT

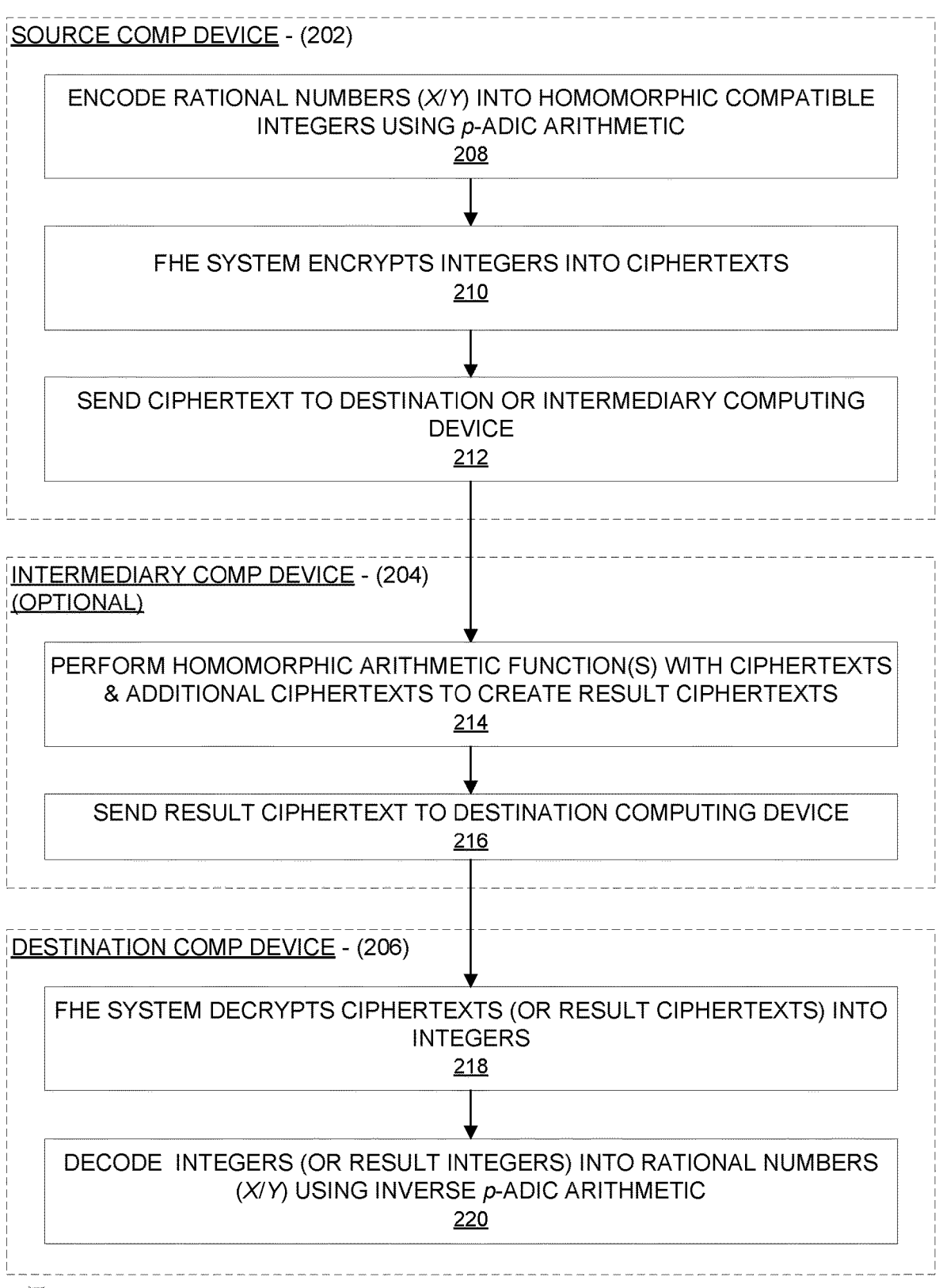

SOURCE COMP DEVICE - (202)

ENCODE RATIONAL NUMBERS (*X/Y*) INTO HOMOMORPHIC COMPATIBLE INTEGERS USING *p*-ADIC ARITHMETIC
208

FHE SYSTEM ENCRYPTS INTEGERS INTO CIPHERTEXTS
210

SEND CIPHERTEXT TO DESTINATION OR INTERMEDIARY COMPUTING DEVICE
212

INTERMEDIARY COMP DEVICE - (204)
(OPTIONAL)

PERFORM HOMOMORPHIC ARITHMETIC FUNCTION(S) WITH CIPHERTEXTS & ADDITIONAL CIPHERTEXTS TO CREATE RESULT CIPHERTEXTS
214

SEND RESULT CIPHERTEXT TO DESTINATION COMPUTING DEVICE
216

DESTINATION COMP DEVICE - (206)

FHE SYSTEM DECRYPTS CIPHERTEXTS (OR RESULT CIPHERTEXTS) INTO INTEGERS
218

DECODE INTEGERS (OR RESULT INTEGERS) INTO RATIONAL NUMBERS (*X/Y*) USING INVERSE *p*-ADIC ARITHMETIC
220

200  FLOW CHART OF OPERATIONS FOR AN EMBODIMENT

FIG. 2

METHODS AND SYSTEMS FOR *P*-ADIC ENCODING AND DECODING OF RATIONAL DATA FOR FHE SYSTEMS

CROSS REFERENCE TO RELATED APPLICATIONS

This application is based upon and claims the benefit of U.S. provisional application Ser. No. 63/386,700, filed Dec. 9, 2022, entitled "PIE p-adic Encoding for High-Precision Arithmetic in Homomorphic Encryption," all of which is also specifically incorporated herein by reference for all that it discloses and teaches.

BACKGROUND OF THE INVENTION

The advancement of science is possible when knowledge is shared and information is exchanged in a seamless manner. In a world where many businesses rely on information as their main assets, analysis over data is a crucial competitive advantage. Consequently, the amount of data processed and stored will continue to increase, creating a demand for virtualized services. To this end, some applications can be provided as cloud computing resources including Internet of Things (IoT), machine learning, virtual reality (VR) and blockchain. As a result, concerns about custody and privacy of data are on the rise.

Modern concealment/encryption employs mathematical techniques that manipulate positive integers or binary bits. Asymmetric concealment/encryption, such as RSA (Rivest-Shamir-Adleman), relies on number theoretic one-way functions that are predictably difficult to factor and can be made more difficult with an ever-increasing size of the encryption keys. Symmetric encryption, such as DES (Data Encryption Standard) and AES (Advanced Encryption Standard), uses bit manipulations within registers to shuffle the concealed text/cryptotext/ciphertext to increase "diffusion" as well as register-based operations with a shared key to increase "confusion." Diffusion and confusion are measures for the increase in statistical entropy on the data payload being transmitted. The concepts of diffusion and confusion in encryption are normally attributed as first being identified by Claude Shannon in the 1940s. Diffusion is generally thought of as complicating the mathematical process of generating unencrypted (plain text) data from the encrypted (cryptotext/ciphertext) data, thus, making it difficult to discover the encryption key of the concealment/encryption process by spreading the influence of each piece of the unencrypted (plain) data across several pieces of the concealed/encrypted (cryptotext) data. Consequently, an encryption system that has a high degree of diffusion will typically change several characters of the concealed/encrypted (cryptotext/ciphertext) data for the change of a single character in the unencrypted (plain) data making it difficult for an attacker to identify changes in the unencrypted (plain) data. Confusion is generally thought of as obscuring the relationship between the unencrypted (plain) data and the concealed/encrypted (cryptotext) data. Accordingly, a concealment/encryption system that has a high degree of confusion would entail a process that drastically changes the unencrypted (plain) data into the concealed/encrypted (cryptotext/ciphertext) data in a way that, even when an attacker knows the operation of the concealment/encryption method (such as the public standards of RSA, DES, and/or AES), it is still difficult to deduce the encryption key.

Homomorphic Encryption is a form of encryption that allows computations to be carried out on concealed ciphertext as it is concealed/encrypted without decrypting the ciphertext that generates a concealed/encrypted result which, when decrypted, matches the result of operations performed on the unencrypted plaintext.

The word homomorphism comes from the ancient Greek language: ὁμός (homos) meaning "same" and μορφή (morphe) meaning "form" or "shape." Homomorphism may have different definitions depending on the field of use. In mathematics, for example, homomorphism may be considered a transformation of a first set into a second set where the relationship between the elements of the first set are preserved in the relationship of the elements of the second set.

For instance, a map f between sets A and B is a homomorphism of A into B if $$f(a_1 \, op \, a_2) = f(a_1) \, op \, f(a_2) | a_1, a_2 \in A$$

where "op" is the respective group operation defining the relationship between A and B.

More specifically, for abstract algebra, the term homomorphism may be a structure-preserving map between two algebraic structures such as groups, rings, or vector spaces. Isomorphisms, automorphisms, and endomorphisms are typically considered special types of homomorphisms. Among other more specific definitions of homomorphism, algebra homomorphism may be considered a homomorphism that preserves the algebra structure between two sets.

SUMMARY OF THE INVENTION

An embodiment of the present invention may comprise a method for Homomorphic Encryption (HE) compatible encoding and decoding of rational data for encrypted data transmission with a Fully Homomorphic Encryption (FHE) system between a source computing device and a destination computing device, the method comprising: encoding by the source computing device at least one rational number x/y into at least one integer corresponding to the at least one rational number x/y as a function of p-adic arithmetic performed on each of the at least one rational number x/y such that the at least one integer retains homomorphic properties; encrypting by the source computing device the at least one integer into at least one ciphertext with the FHE system operating on the source computing device; sending by the source computing device the at least one ciphertext to the destination computing device; decrypting by the destination computing device the at least one ciphertext into the at least one integer with the FHE system operating on the destination computing device; and decoding by the destination computing device the at least one integer into the at least one rational number x/y corresponding to the at least one integer as a function of inverse p-adic arithmetic performed on each of the at least one integer.

An embodiment of the present invention may further comprise a PIE (p-adic encoding) system that encodes and decodes rational data with Homomorphic Encryption (HE) compatibility for encrypted data transmission with a Fully Homomorphic Encryption (FHE) system between a source computing device and a destination computing device, the PIE system comprising: the source computing device, wherein the source device further comprises: a PIE encode subsystem that encodes at least one rational number x/y into at least one integer corresponding to the at least one rational number x/y as a function of p-adic arithmetic performed on each of the at least one rational number x/y such that the at least one integer has homomorphic properties and is HE compatible; the FHE system operating on the source computing device that encrypts the at least one integer into at least one ciphertext; a ciphertext send subsystem that sends the at least one ciphertext to the destination computing device; the destination computing device, wherein the destination computing device further comprises: the FHE system operating on the destination computing device that decrypts the at least one ciphertext into the at least one integer; and a PIE decode subsystem that decodes the at least one integer into the at least one rational number x/y corresponding to the at least one integer as a function of inverse p-adic arithmetic performed on each of the at least one integer.

BRIEF DESCRIPTION OF THE DRAWINGS

In the drawings,
FIG. 2 is a flow chart of operations for an embodiment.

DETAILED DESCRIPTION OF THE EMBODIMENTS

Figure 1:
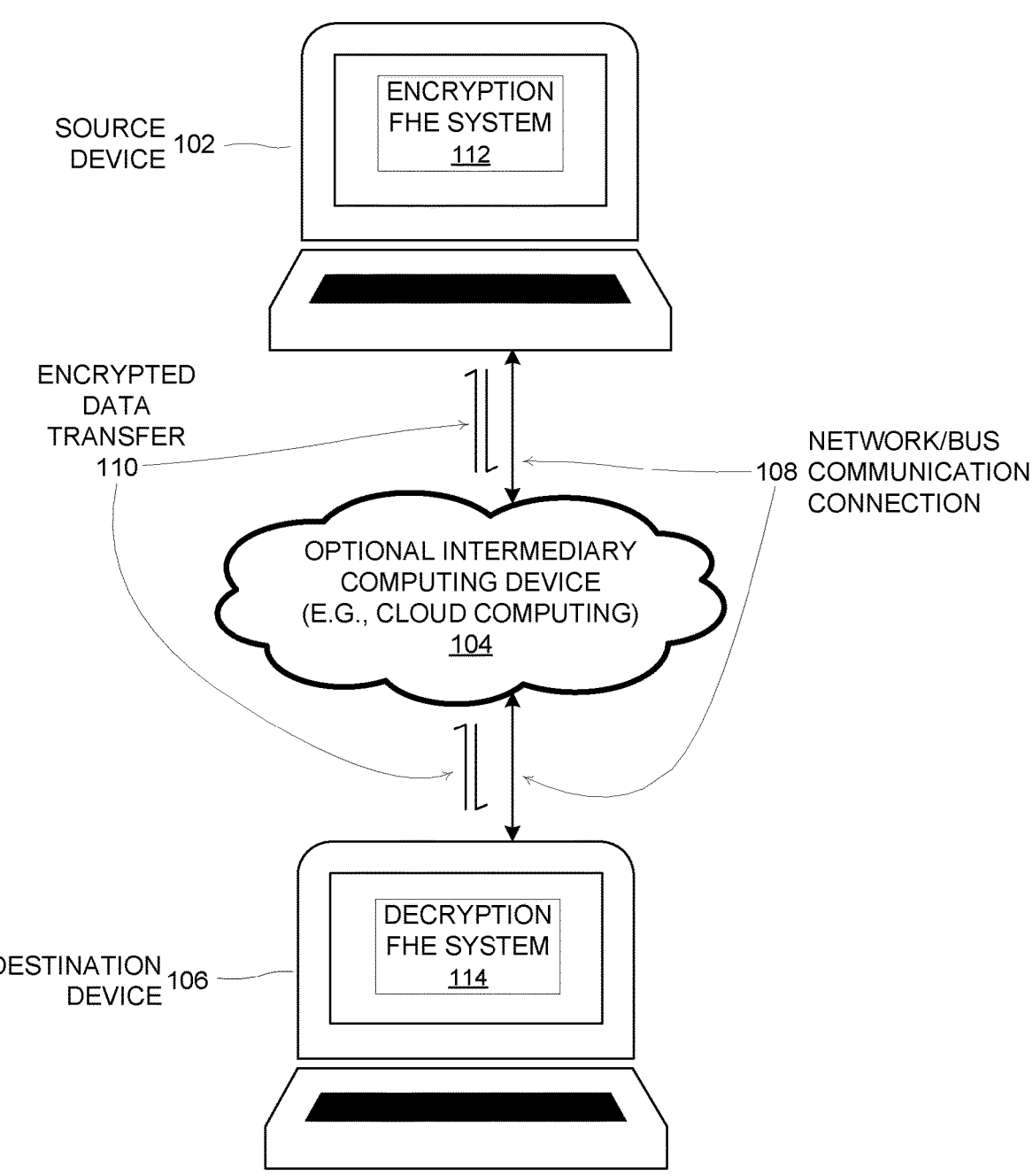
FIG. 1 is a block diagram of the hardware implementation for an embodiment.

A large part of current research in Homomorphic Encryption (HE) aims towards making HE practical for real-world applications. In any practical HE, an important issue is to convert the application data (type) to the data type suitable for the HE.

The main purpose of this work is to investigate an efficient HE-compatible encoding method that is generic, and can be easily adapted to apply to the HE schemes over integers or polynomials.

p-adic number theory provides a way to transform rationals to integers, which makes it a candidate for encoding rationals. Although one may use naive number-theoretic techniques to perform rational-to-integer transformations without reference to p-adic numbers, we contend that the theory of p-adic numbers is the proper lens to view such transformations.

In this work we identify mathematical techniques (supported by p-adic number theory) as appropriate tools to construct a generic rational encoder, which is compatible with HE. Based on these techniques, we propose a new encoding scheme PIE (p-adic encoding) that can be easily combined with both AGCD (Approximate Greatest Common Divisor)-based and RLWE (Ring Learning With Error)-based HE to perform high precision arithmetic. After presenting an abstract version of PIE, we show how it can be attached to two well-known HE schemes: the AGCD-based IDGHV (Integer—Dijk, Gentry, Halevi, and Vaikuntanathan) scheme and the RLWE-based (modified) Fan-Vercauteren (FV) scheme. We also discuss the advantages of our encoding scheme in comparison with previous works.

1 Introduction

Much of current research and development in HE is focused on efficient implementation with suitable software and/or hardware support and developing practically usable libraries for HE that can be used for various machine learning and data analysis applications. These works clearly aim towards making HE practical for real-world applications.

The state-of-the-art HE schemes are defined to process (modulo) integer inputs or polynomial inputs (with modulo integer coefficients). For a significantly large number of practical applications, an HE scheme should be able to operate on real/rational numbers. In any practical HE an important issue is to convert the application data (type) to the data type suitable for the HE. This is usually achieved by encoding real-valued data to convert it into a "suitable" form compatible with homomorphic encryption. Any encoding must come with a matching decoding. Additionally, such an encoding must be homomorphic with respect to addition and multiplication, and injective. Most importantly, any such encoding technique must be efficient and not hinder the efficiency of the underlying HE scheme.

The interest in HE-compatible encoding to process real/rational inputs efficiently is evident from a number of previous works. In most of the RLWE (Ring Learning with Error) hardness-based homomorphic encryption schemes, a plaintext is viewed as an element of the ring $R_t = \mathbb{Z}_t[x]/\phi_m(x)$ where $\phi_m(x)$ is the m-th cyclotomic polynomial and $\mathbb{Z}_t$ is the ring of integers modulo t. Encoding integer input to a polynomial in $R_t$ is relatively straightforward, namely one can consider the base t representation of the integer. For allowing integer and rational inputs one must define encoding converting elements of $\mathbb{Z}$ or $\mathbb{Q}$ (typically represented as fixed-point decimal numbers in applications) into elements of Rr. Previous works have proposed several encoding methods for integers and rationals. One previously taken approach is to scale the fixed-point numbers to integers and then encode them as polynomials (using a suitable base). Another approach is to consider them as fractional numbers. It was shown that these two representations are isomorphic. The latter approach, although avoiding the overhead of bookkeeping homomorphic ciphertext, is difficult to analyze.

All of the aforementioned encodings share a problem; namely, t must have a sufficiently large value for the encoding to work correctly. This large value of t means one may need to choose large parameters for the overall homomorphic encryption scheme hindering the efficiency. A clever solution to this problem was proposed by Chen, Len, Player and Xia (CLPX), which borrows a mathematical technique from Hoffstein and Silverman and combines it with the homomorphic encryption scheme proposed by Fan and Vercauteren (FV). The main idea of the so-called CLPX encoding is to replace the modulus t with the polynomial x–b for some positive integer b and turning the plaintext space into the quotient ring $\mathbb{Z}/(b^n+1)\mathbb{Z}$. Note that CLPX encoding converts fractional or fixed-point numbers and the scheme combines it with a modified version (which we will call ModFV) of the original FV scheme.

In the CLPX encoding, the rational (input) domain is a finite subset of $\mathbb{Q}$ and, therefore, is not closed under the usual compositions (addition and multiplication) which can potentially lead to overflow problems. That is, if the composition of two rational inputs lies outside the domain then its decoding (after homomorphic computation) will be incorrect. However, they do not provide any analytical discussion or solution towards solving this problem. The theory behind our encoding, which also transforms fixed-point (decimal) numbers, allows us to provide an analytical solution to this problem.

1.1 Our Results

The main aim of our work is to investigate an efficient HE-compatible encoding method that is generic (not necessarily targeted for a specific HE scheme) and can be easily adapted to apply to the HE schemes over integers or polynomials. The results of this work are as follows:

We construct an efficient and generic encoding (and decoding) scheme based on a transformation that stems from p-adic number theory. First, we identify the tools and techniques provided by p-adic number theory to derive the foundational injective transformation that maps rationals to (modulo) integers, and is additively and multiplicatively homomorphic. The encoding scheme follows naturally from this injective transformation. We call this new encoding PIE (p-adic encoding).

We use the structural properties of the rational domain (of the abovementioned transformation) to provide a bound on the domain size ensuring that there is no overflow from (additive or multiplicative) composition, thus, causing incorrect decoding. The previous work, did not address this overflow problem.

Finally, we demonstrate that our encoding map can be easily applied to both Approximate Greatest Common Divisor (AGCD)-based and RLWE-based (over polynomial rings) HEs using the Batch FHE (Fully Homomorphic Encryption) and the modified Fan-Vercauteren (ModFV) schemes respectively. We also discuss how the (public) parameters of these HEs can be used to setup the parameters of PIE.

We show our encoding scheme allows for a much larger input space compared to the previous encoding schemes for an RLWE-based HE without severely compromising the circuit depth that can be evaluated using the HE. To the best of our knowledge this is the first work discussing an encoding scheme for AGCD-based schemes.

We implemented PIE using C++ (together with proof-of-concept implementations of IDGHV (Batch FHE) and ModFV schemes (FHE part of our implementation is not optimized) to estimate the efficiencies of the encoding and decoding. The results of our experiment are given in Section 6.

2 Notations and Foundations

In this section we introduce the basic ideas and techniques from p-adic number theory that are necessary for developing our encoding scheme. We emphasize that the ideas described in this section are self-contained and do not assume prior knowledge of p-adic number theory.

2.1 Notations.

For a real number r, the functions $\lfloor r \rfloor$, $\lceil r \rceil$, $\lfloor r \rceil$ denote the usual "floor", "ceiling", and "round-to-nearest-integer" functions. For an integer a, |a|bits denotes the bit length of a. The ring of integers is denoted by $\mathbb{Z}$, and the field of rationals by $\mathbb{Q}$. For a positive integer n, $\mathbb{Z}/n\mathbb{Z}$ denotes the ring of integers modulo n. In case n is prime, we sometimes write $\mathbb{F}_n$. To distinguish this ring (field) from sets of integer representatives, we denote by $\mathcal{Z}_n$ the set $[-\lceil (n-1)/2 \rceil, \lfloor (n-1)/2 \rfloor] \cdot \mathbb{Z}$. For integers a, n we denote by a mod n the unique integer $\bar{a} \in \mathcal{Z}_n$ such that n|(a−ā). Similarly, we use the elements of $\mathcal{Z}_n$ as representatives of the cosets of $\mathbb{Z}/n\mathbb{Z}$, and sometimes use $\mathcal{Z}_n$ in place of $\mathbb{Z}/n\mathbb{Z}$, though in this case we are careful to put "mod n" where appropriate. For a polynomial p, $\lfloor p \rceil$ and $[p]_n$ denote the rounding of each coefficient to the nearest integer, and the reduction of each coefficient modulo n. We use everywhere log(·) in place of $\log_2(\cdot)$. "Input space" will always mean the set of fractions for which encoding correctness holds, and "message space" always means a subset of the input space for which homomorphic correctness (for arithmetic circuits up to a certain depth) holds.

2.2 Results and Techniques from p-adic Arithmetic.

Roughly speaking, p-adic number theory allows us to represent a rational $$\frac{x}{y} \in \mathbb{Q}$$

using integers.

$$\text{If } \frac{x}{y} \in \mathbb{Q}$$

and p is a prime then we have:

$$\frac{x}{y} = \sum_{j=n}^{\infty} a_j p^j = a_n p^n + a_{n+1} p^{n+1} + \dots , \qquad \text{Eq. 1}$$

where $0 \le a_j < p$ and $n \in \mathbb{Z}$. When $n \in \mathbb{Z}^+ \cup \{0\}$ the sum in 1 is called a p-adic integer. Equivalently, observe that any rational x/y can be rewritten in the form:

$$\frac{x}{y} = \frac{x'}{y'} p^v,$$

$$\text{where } gcd(x', \ p) = gcd(y', \ p) = 1$$

The number v is called the p-adic valuation of x/y. In case $v \ge 0$, x/y is a p-adic integer. The ring of p-adic integers is denoted by $\mathbb{Z}_p$.

An r-segment p-adic representation, a.k.a. Hensel code, simply truncates the above sum after j=r−1. In this case, the power series in eq. (1) becomes:

$$\sum_{j=n}^{r-1} a_j p^j + O(p^r)$$

A natural consequence of this truncated representation is a mapping (discussed in detail in Definition 3) from a set of rationals to $\mathbb{Z}/p^r\mathbb{Z}$. This mapping is the main component of our encoding scheme.

A specific set of rational numbers (p-adic numbers) called the Farey rationals are defined as follows.

Definition 1 (Farey Rationals): Given a prime p and an integer $r \ge 1$, let $$N = \left\lfloor \sqrt{\frac{p^r - 1}{2}} \right\rfloor.$$

The Farey rationals are defined as:

$$\mathcal{F}_N = \left\{ \frac{x}{y} : 0 \le |x| \le N, \ 1 \le y \le N \right\}, \qquad \text{Eq. 2}$$

where gcd(x, y)=gcd(y, p)=1. (gcd is greatest common denominator)

We note that every rational in $\mathcal{F}_N$ has p-adic valuation $v \ge 0$, and therefore $\mathcal{F}_N \subset \mathbb{Z}_p$; i.e. every Farey rational is a p-adic integer.

For describing the mapping on which our encoder is based, we need to introduce the Modified Extended Euclidean algorithm MEEA. The MEEA is simply a truncated version of the extended Euclidean algorithm (EEA) and is similarly efficient. We pause briefly to describe the EEA. Recall that the EEA calculates the greatest common divisor of two integers $x_0$, $x_1$ along with the associated Bézout coefficients $y$, $z \in \mathbb{Z}$ such that $x_0 \cdot y + x_1 \quad z = \gcd(x_0, x_1)$. The computation generates the tuples $(x_2, \ldots, x_n)$, $(y_2, \ldots, y_n)$, $(z_2, \ldots, z_n)$, and $q_i = \lfloor x_{i-1}/x_i \rfloor$ such that:

$$x_{i+1} = x_{i-1} - q_i x_i, \quad \text{where } x_0, x_1 \text{ are the input,}$$

$$y_{i+1} = y_{i-1} - q_i y_i, \quad \text{with } y_0 = 0, y_1 = 1,$$

$$z_{i+1} = z_{i-1} - q_i z_i, \quad \text{with } y_0 = 0, z_1 = 0.$$

Moreover, for each $i \leq n$, we have $y_i x_1 + z_i x_0 = x_i$. The computation stops with $x_n = 0$, at which point $x_n - 1 = \gcd(x_0, x_1)$.

Definition 2 (MEEA): Given $x_0, x_1 \in \mathbb{Z}$, $\text{MEEA}(x_0, x_1)$ is defined as the output $(x, y) = ((-1)^{i+1} x_i, (-1)^{i+1} y_i)$ of the extended Euclidean algorithm (as described above) once $|x_i| \leq N$.

Now we are ready to define the necessary mapping from $\mathcal{F}_N$ to $\mathcal{Z}_{p^r}$.

Definition 3: The mapping $H_{p^r}: \mathcal{F}_N \to \mathcal{Z}_{p^r}$ and its inverse are defined as:

$$H_{p^r}\left(\frac{x}{y}\right) = x y^{-1} \bmod p^r, \qquad \text{Eq. 3}$$

$$H_{p^r}^{-1}(h) = \text{MEEA}(p^r, h). \qquad \text{Eq. 4}$$

The H-mapping is injective and, therefore, gives a unique representation of each element of $\mathcal{F}_N$ in $\mathcal{Z}_{p^r}$. The inverse of $H_{p^r}$ is well-defined.

Proposition 1. For all $x/y \in \mathcal{F}_N$ and $h \in H_{p^r}(\mathcal{F}_N) \subseteq \mathcal{Z}_{p^r}$, $$H_{p^r}^{-1}\left(H_{p^r}(x/y)\right) = x/y, \qquad \text{(i)}$$

$$H_{p^r}\left(H_{p^r}^{-1}(h)\right) = h, \qquad \text{(ii)}$$

$$\text{If } a, a' \in \mathbb{Z} \text{ and } a' = a(\bmod p^r), \qquad \text{(iii)}$$

Proof. Let $x/y \in \mathcal{F}_N$, $H_{p^r}(x/y) = h$, and suppose $H_{p^r}^{-1}(h) = a/b$. By definition of the MEEA and $H_{p^r}^{-1}$, there is an integer $c$ such that $bh + cp^r = a$. But then $b(xy^{-1}) \equiv a \pmod{p^r}$, which implies $xy^{-1} \equiv ab^{-1} \pmod{p^r}$. That is, $H_{p^r}(a/b) = H_{p^r}(x/y)$. That $a/b = xy$ then follows from injectivity of $H_{p^r}$.

(ii) Let $\in H_{p^r}(\mathcal{F}_N) \subseteq \mathcal{Z}_{p^r}$, and suppose $H_{p^r}^{-1}(h) = x/y$. By definition of the MEEA, there is an integer $z$ such that $yh + zp^r = x$. Clearly $xy^{-1} \equiv h \pmod{p^r}$, proving the result.

(iii) Let $h' = h + kp^r$, the $\text{MEEA}(p^r, h')$ generates tuples $(x'_0, x'_1, x'_2, x'_3, \ldots) = (p^r, h', p^r, h, \ldots)$ and $(y'_0, y'_1, y'_2, y'_3, \ldots) = (0, 1, 0, 1, \ldots)$. Whereas running MEEA with $p^r$ and $h$ generates tuples $(x_0, x_1, \ldots) = (p^r, h, \ldots)$ and $(y_0, y_1, \ldots) = (0, 1, \ldots)$. Notice that $x'_2 = x_0$ and $y'_2 = y_0$. An easy induction shows that $x'_i = x_{i-2}$ and $y'_i = y_{i-2}$, for $i = 2, 3, \ldots$, whence $\text{MEEA}(p^r, h') = \text{MEEA}(p^r, h)$. This completes the proof.

Proposition 2. The mappings $H_{p^r}$ and $H_{p^r}^{-1}$ are homomorphic with respect to addition and multiplication in the following sense.

For all $u, u' \in \mathcal{F}_N$, $H_{p^r}(u) \cdot H_{p^r}(u') =$     (i)

$$H_{p^r}(u \cdot u') \bmod p^r \text{ and } H_{p^r}(u) + H_{p^r}(u') = H_{p^r}(u + u') \bmod p^r.$$

If $h, h' \in \mathbb{Z}_{p^r}$ and $H_{p^r}^{-1}(h) \cdot H_{p^r}^{-1}(h'), H_{p^r}^{-1}(h) +$     (ii)

$$H_{p^r}^{-1}(h') \in \mathcal{F}_N, \text{ then } H_{p^r}^{-1}(h \cdot h') =$$

$$H_{p^r}^{-1}(h) \cdot H_{p^r}^{-1}(h') \text{ and } H_{p^r}^{-1}(h + h') = H_{p^r}^{-1}(h) + H_{p^r}^{-1}(h')$$

Proof. (i) Let $a/b$, $c/d \in \mathcal{F}_N$. By definition of the Farey rationals, $a$, $b$, $c$, $d$ are co-prime with $p$. That $H_{p^r}$ is homomorphic with respect to addition and multiplication follows from the properties of congruences:

$$ac(bd)^{-1} = (ab^{-1})(cd^{-1}) \bmod p^r \text{ and } (ad + bc)(bd)^{-1} = (ab^{-1} + cd^{-1}) \bmod p^r$$

(ii) Invoking the homomorphic property of $H_{p^r}$, from $H_{p^r}^{-1}(h) \cdot H_{p^r}^{-1}(h')$, $H_{p^r}^{-1}(h) + H_{p^r}^{-1}(h') \in \mathcal{F}_N$ we obtain $h \cdot h'$, $h + h' \in H_{p^r}(\mathcal{F}_N)$. By proposition 1(ii), $H_{p^r}(H_{p^r}^{-1}(h \cdot h')) = h \cdot h'$ and $H_{p^r}(H_{p^r}^{-1}(h + h')) = h + h'$. The result follows from the injectivity of $H_{p^r}$.

Example 1. Given rationals $a = 12.37$ and $b = 8.3$, we choose $p = 3$, $r = 10$. Here $N = \lfloor \sqrt{(p^r - 1)/2} \rfloor = 125261$. We compute the encodings of $a$ and $b$ as $h_1$ and $h_2$:

$$h_1 = H_{p^r}\left(\frac{1237}{100}\right) = 2196674185$$

$$h_2 = H_{p^r}\left(\frac{83}{10}\right) = 9414317891$$

We can now compose the rationals with addition, subtraction, and multiplication, and decode to check correctness:

$$r_1 = h_1 + h_2 \bmod p^r = 11610992076, H_{p^r}^{-1}(r_1) = \frac{2067}{100} = 20.67$$

$$r_2 = h_1 - h_2 \bmod p^r = 24163415903, H_{p^r}^{-1}(r_2) = \frac{407}{100} = 4.07$$

$$r_3 = h_1 h_2 \bmod p^r = 2541865931, H_{p^r}^{-1}(r_3) = \frac{102671}{1000} = 102.671$$

CHOICE OF $p$ AND $r$. At this point it is clear that the H-mapping (in definition 3) can be used to map a set of Farey rationals into $\mathcal{Z}_{p^r}$. Thus, it can be used for encoding rational data that are contained in the set of Farey rationals which is the domain of the mapping. A natural question is: given a set of rationals how to choose $p^r$ (and, therefore, N) so that $\mathcal{F}_N$ contains the rationals one wishes to encode? We point out that for a finite set of rationals S, one can choose $p^r \geq \max_{a,b:a/b \in S}(2a^2 + 1, 2b^2 + 1)$. Choosing a small $p$ and a very large $r$ is possible, though this could restrict the number of rationals that can be mapped due to the god condition (in definition 1). We illustrate this with examples in Supplemental A below.

Replacing the prime power with a composite. The above results can be extended when $p^r$ is replaced by an arbitrary positive integer g. Let $p_1, \ldots, p_k$ be distinct primes, $g = p_1^{r_1} \ldots p_k^{r_k}$, and $N = \lfloor \sqrt{(g-1)/2} \rfloor$. The Farey rationals defined by g are simply the set of reduced fractions:

$$\mathcal{F}_N = \left\{ \frac{x}{y} \;\middle|\; 0 \le |x| \le N, 1 \le y \le N, gcd(y, g) = 1, gcd(x, y) = 1 \right\}$$

We briefly recall (the integer version of) the Chinese Remainder Theorem (CRT), as it is necessary for our encoding scheme.

Definition 4 (Chinese Remainder Theorem). Let $n_1, \ldots, n_k$ be k co-prime integers, and $n = \Pi_{i=1}^{k} n_i$. The CRT describes the isomorphism $\mathbb{Z}/n\mathbb{Z} \cong \mathbb{Z}/n_1\mathbb{Z} \times \ldots \times \mathbb{Z}/n_k\mathbb{Z}$ given by:

$$x \to (x \bmod n_1, \ldots, x \bmod n_k)$$

We denote the x such that $x = h_i \bmod n_i$ and $(h_1, \ldots, h_k) \in \mathbb{Z}/n_1\mathbb{Z} \times \ldots \times \mathbb{Z}/n_k\mathbb{Z}$ by $CRT_{n_1, \ldots, n_k}(h_1, \ldots, h_k)$.

Remark 1. In the following definition, we abuse notation slightly and identify $CRT \ldots (\ldots)$ not with actual ring elements in $\mathbb{Z}/n\mathbb{Z}$, but with integer representatives in $\mathcal{Z}_n$.

Definition 5. The injective mapping $H_g: \mathcal{F}_N \to \mathcal{Z}_g$ and its inverse are defined as:

$$H_g(x/y) = CRT_{p_1^{r_1}, \ldots, p_k^{r_k}}\left( H_{p_1^{r_1}}(x/y), \ldots, H_{p_k^{r_k}}(x/y) \right) \qquad \text{Eq. 5}$$

$$H_g^{-1}(h) = MEEA(g, h) \qquad \text{Eq. 6}$$

The following proposition is an extension of proposition 1 for composite g and its proof proceeds similar to the proof of proposition 1.

Proposition 3. Let $N = \lfloor \sqrt{(g-1)/2} \rfloor$. For all $x/y \in \mathcal{F}_N$ and $h \in H_g(\mathcal{F}_N) \subsetneq \mathcal{Z}_g$, $$H_g^{-1}(H_g(x/y)) = x/y, \text{ and} \qquad \text{(i)}$$

$$H_g(H_g^{-1}(h)) = h. \qquad \text{(ii)}$$

If $h, h' \in \mathbb{Z}$ and $h' = h(\bmod g)$, then $H_g^{-1}(h) = H_g^{-1}(h')$. (iii)

Proposition 4. The mapping $H_g$ is homomorphic with respect to addition and multiplication, and $H_g^{-1}$ is homomorphic as in proposition 2.

Proof. Let $N = \lfloor \sqrt{(g-1)/2} \rfloor$, and $u, u' \in \mathcal{F}_N$. Using the homomorphic properties of the CRT where necessary, we have:

$$H_g(u + u') = CRT_{p_1^{r_1}, \ldots, p_k^{r_k}}\left( H_{p_1^{r_1}}(u + u'), \ldots, H_{p_k^{r_k}}(u + u') \right),$$

and $$H_g(u) + H_g(u') =$$

$$CRT_{p_1^{r_1}, \ldots, p_k^{r_k}}\left( H_{p_1^{r_1}}(u) + H_{p_1^{r_1}}(u'), \ldots, H_{p_k^{r_k}}(u) + H_{p_k^{r_k}}(u') \right)$$

By proposition 2(i), each $$H_{p_i^{r_i}}(u) + H_{p_i^{r_i}}(u') = H_{p_i^{r_i}}(u + u') \bmod p_i^{r_i}.$$

Whence $H_g(u + u') = H_g(u) + H_g(u')$. The proof that $H_g(u \cdot u') = H_g(u) \cdot H_g(u')$ is analogous.

To establish the homomorphic properties of $H_g^{-1}$ simply replace $p^r$ by g everywhere in the proof of proposition 2(ii).

Example 2. Suppose we have the same rationals of Example 1: a=12.37 and b=8.3. We now choose p=6, r=17 and g=p+1=16926659444737, which yields $N = \lfloor \sqrt{(g-1)/2} \rfloor = 2909180$. The encodings of a and b are:

$$h_1 = H_g\left(\frac{1237}{100}\right) = 16757392850302$$

$$h_2 = H_g\left(\frac{83}{10}\right) = 1692665944482$$

Again, we compose the encodings, and verify the correctness of the results:

$$r_1 = h_1 + h_2 \bmod g = 1523399350047, \; H_g^{-1}(r_1) = \frac{2067}{100} = 20.67$$

$$r_2 = h_1 - h_2 \bmod g = 15064726905820, \; H_g^{-1}(r_2) = \frac{407}{100} = 4.07$$

$$r_3 = h_1 h_2 \bmod g = 7058416988558, \; H_g^{-1}(r_3) = \frac{102671}{1000} = 102.671$$

Remark 2. Definitions 3 and 5 coincide when $g = p^r$ (a prime power), so one should take the latter as the general definition of H and $H^{-1}$, picking g to be a prime power when necessary.

Size of the set. The cardinality of $\mathcal{F}_N$ for $N = \lfloor \sqrt{(g-1)/2} \rfloor$ depends heavily on the choice of g. This is because the number of fractions x/y with $|x|, |y| \le N$ that fail the condition $gcd(y, g) = 1$ depends on the prime factorization of g—the more "small" prime factors g has, the more fractions fail the god condition.

Proposition 5. The cardinality of $\mathcal{F}_N$ for $N = \lfloor \sqrt{(g-1)/2} \rfloor$ is given by:

$$4 \cdot \Phi(N) + 1 - (\# \text{ of } x/y \text{ with } gcd(y, g) \ne 1),$$

where $\Phi(k) = \Sigma_{i-1}^{k} \phi(i)$ and $\phi$ is the Euler's totient function.

Proof. Use the fact that the $k^{th}$ Farey sequence (the $k^{th}$ Farey sequence is the set of reduced fractions in the interval [0, 1) with numerator and denominator each at most k) has length $1 + \Phi(k)$, and then enforce the god condition on the Farey rationals.

Simulations show that when g is an odd prime, $$|\mathcal{F}_N| = 4 \cdot \Phi(N) + 1 \approx 0.6g. \qquad \text{Eq. 7}$$

This fact will be used for comparison with existing work in section 5.2 below.

3 PIE: A Rational Encoder

Let g be a positive integer, $N = \lfloor \sqrt{(g-1)/2} \rfloor$, and make $\mathcal{F}_N$ the input space. We define encoding and decoding as follows:

PIE.Encode(x/y). For $x/y \in F_N$ output $H_g(x/y)$
PIE.Decode(z). For $z \in \mathcal{Z}_g$, output $H_g^{-1}(z)$ Proposition 6. For all m, m'$\in \mathcal{F}_N$ such that m·m'$\in \mathcal{F}_N$,

---

PIE.Decode([PIE.Encode(m) · PIE.Encode(m') mod g]) = m · m'
and $\forall$m, m' $\in \mathcal{F}_N$ such that m + m' $\in \mathcal{F}_N$
PIE.Decode([PIE.Encode(m) + PIE.Encode(m') mod g]) = m + m'

---

Proof. Use proposition 3(i), proposition 3(iii), and proposition 4.

Corollary 1. Let p be a multivariate polynomial with coefficients in $\mathbb{Q}$. For all $m_0, \ldots, m_k \in \mathcal{F}_N$ such that $p(m_0, \ldots, m_k) \in \mathcal{F}_N$,

---

PIE.Decode(g, p(PIE.Encode(g, $m_0$), . . . , PIE.Encode(g, $m_k$)) mod g)
= p($m_0$, . . . , $m_k$).

---

As indicated in the preceding results, for the encoding (and decoding) to yield the correct result when used in an HE scheme, one must ensure that if two or more elements from $\mathcal{F}_N$ are combined using additions and/or multiplications then any intermediates and the final output must not lie outside the set $\mathcal{F}_N$. For this reason, we will define the (rational) message space to be the following subset of $\mathcal{F}_N$:

$$\mathcal{G}_M = \{x/y \in \mathcal{F}_N : 0 \le |x| \le M, 1 \le y \le M\} \qquad \text{Eq. 8}$$

The main idea behind choosing a subset of $\mathcal{F}_N$ as the set of messages is that when elements from $\mathcal{G}_M$ are combined, the resulting element can be in $\mathcal{F}_N$. Ensuring the output lands in $\mathcal{F}_N$ induces a bound on the number of computations that can be performed, and determines the choice of parameters involved therein. At this point, one might wonder whether we need to do something similar with the range $\mathcal{Z}_g$ of the encoder to make sure that overflow modulo g does not occur during computations. The answer is "no". This is because proposition 3(iii) along with the above message space restriction imply that overflow modulo g does not affect decoding.

The choice of M depends jointly on the rational data one must encode, and the circuits one must evaluate over those data. We elaborate this in the following section.

3.1 Choosing the Message Space $\mathcal{G}_M$.

We will describe an arithmetic circuit in terms of the multivariate polynomial it computes. To this end, recall that the $\ell_1$-norm of a polynomial is simply the sum of the absolute values of its coefficients.

Polynomials with which PIE is compatible. Let $\mathcal{P}_{d,t}$ denote the set of polynomials in $\mathbb{Q}[x_1, x_2, \ldots]$ with total degree at most d and $\ell_1$-norm at most t, whose coefficients have absolute value at least 1. For example, $\mathcal{P}_{d,t}$ contains polynomials of the form:

$$p(x_1, \ldots, x_k) = \sum_{d_1 + \ldots + d_k \le d} \sum_{\alpha=1}^{I} c_\alpha x_1^{d_1} x_1^{d_2} \ldots x_k^{d_k},$$

where each $|c_\alpha| \ge 1$, and $\Sigma_\alpha |c_\alpha| \le t$.

The following proposition establishes an upper bound on the output of a polynomial in $\mathcal{P}_{d,t}$ when all inputs are from $\mathcal{G}_M$.

Proposition 7. If $x_1/y_1, \ldots, x_k/y_k \in \mathcal{G}_M$, $p \in \mathcal{P}_{d,t}$ is k-variate, and $p(x_1/y_1, \ldots, x_k/y_k)=x/y$, then:

$$|x| \le t \cdot M^{dt} \text{ and } |y| \le M^{dt}$$

Proof. Note that $\mathcal{P}_{d,t}$ can be written as, $p=\Sigma_i c_i p_i$, where $\Sigma_i |c_i| \le t$, each $|c| \ge 1$, and each $p_i$ is a monomial of degree at most d.

$$\text{Let } p = \sum_{i=1}^{I} c_i p_i.$$

Since $\deg(p_i) \le d$, the evaluation $p_i(x_1/y_1, \ldots, x_k/y_k)$ is a fraction of the form:

$$\frac{a_i}{b_i} = \frac{x_{i_1} x_{i_2} \cdots x_{i_\ell}}{y_{i_1} y_{i_2} \cdots y_{i_\ell}}, \text{ for some } \ell \le d \text{ and } \{i_1, \ldots, i_\ell\} \subseteq \{1, \ldots, k\}.$$

As each $x_i/y_i \in \mathcal{G}_M$, we have $|a_i|, |b_i| \le M^\ell \le M^d$.

Since $x/y=\Sigma_{i=1}^{1} c_i \cdot a_i/b_i$, there are nonzero integers $\alpha$ and $\beta$ such that:

$$\alpha x = (c_1 a_1) b_2 b_3 \ldots b_I +$$
$$b_1(c_2 a_2) b_3 \ldots b_I + b_1 b_2 \ldots b_{I-1}(c_I a_I) \text{ and } \beta y = b_1 b_2 \ldots b_I.$$

It follows from $\Sigma|c_i| \le t$ and the above bound on $|a_i|, |b_i|$ that:

$$|x| \le \sum_{i=1}^{1} |c_i| (M^d)^I \le t \cdot M^{dI} \text{ and } |y| \le M^{dI}.$$

The proof is completed by observing that $|c_i| \ge 1$, for all i, implies $I \le t$.

Proposition 8. A sufficient condition for compatibility of PIE with polynomials in $\mathcal{P}_{d,t}$ as in Corollary 1:

$$PIE. \qquad \text{Eq. 9}$$
$$\text{Decode}(g, p(PIE.\text{Encode}(g, m_0), \ldots, PIE \text{ Encode}(g, m_k)) \bmod g) =$$
$$pm_0, \ldots, m_k)$$

is $$M \le \left(\frac{N}{t}\right)^{\frac{1}{dt}}, \text{ equivalently } d \le \frac{\log(N) - \log(t)}{t \log(M)}.$$

Proof. Suppose M is chosen according to eq. (9), and let $p \in \mathcal{P}_{d,t}$ be k-variate. According to proposition 7, if $m \ne \mathcal{G}_M^k$ and $p(m)=x/y$, then:

$$|x| \le t \cdot M^{dt} \le t \cdot \left((N/t)^{\frac{1}{dt}}\right)^{dt} = N, \text{ and} \qquad \text{Eq. 10}$$

$$|y| \le M^{dt} \le \left((N/t)^{\frac{1}{dt}}\right) = N/t \le N. \qquad \text{Eq. 11}$$

Clearly gcd(g, y)=1, since y is a factor of the product of the denominators in m. Thus $p(m) \in \mathcal{F}_N$, and the proof is completed.

4 PIE with a Batch FHE over Integers

Batch FHE. Let $\lambda$ be the security parameter, $\gamma$ and $\eta$ be the bit-length of the public and secret key respectively, and $\rho$ be the bit-length of noise. Further, choose $\ell_Q$-bit integers $Q_1, \ldots, Q_\ell$. The IDGHV scheme is defined as follows.

IDGHV.KGen($1^\lambda$, $(Q_j)_{1 \leq j \leq \ell}$). Choose distinct $\eta$-bit primes $p_1, \ldots, p_\ell$, and let $\pi$ be their product. Choose a uniform $2^\lambda$-rough integer $q_0 < 2^{\gamma/\pi}$, and let the public key be $x_0 = q_0 \cdot \pi$ (An integer is b-rough provided it has no prime factors smaller than b). It is required that $\gcd(\Pi_j Q_j, x_0) = 1$. Choose integers $x_i$, and $x'_i$ with a quotient by $\pi$ uniformly and independently distributed in $\mathbb{Z} \cap [0, q_0)$, and with the distribution of modulo $p_j$ for $1 \leq j \leq \ell$ as follows:

$$1 \leq i \leq \tau,\ x_i \bmod p_j = Q_j r_{i,j}, \qquad r_{i,j} \leftarrow \mathbb{Z} \cap (-2^\rho, 2^\rho)$$

$$1 \leq i \leq \ell,\ x'_i \bmod p_j = Q_j r'_{i,j} + \delta_{i,j},\ r'_{i,j} \leftarrow \mathbb{Z} \cap (-2^\rho, 2^\rho)$$

Let $pk = \{x_0,\ (Q_i)_{1 \leq i \leq \ell},\ (x_i)_{1 \leq i \leq \tau},\ (x'_i)_{1 \leq i \leq \ell}\}$ and $sk = (p_j)_{1 \leq j \leq \ell}$.

IDGHV.End(pk,m). For $m = (m_1, \ldots, m_\ell) \in \mathbb{Z}/Q_1\mathbb{Z} \times \ldots \times \mathbb{Z}/Q_\ell\mathbb{Z}$, choose a random binary vector $b = (b_1, \ldots, b_\tau)$ and output the ciphertext:

$$c = \left( \sum_{i=1}^{\ell} m_i \cdot x'_i + \sum_{i=1}^{\tau} b_i \cdot x_i \right) (\bmod\ x_0)$$

---

IDGHV.Dec(sk,c). $m = (m_1, \ldots, m_\ell)$ where $m_j \leftarrow c \bmod p_j \pmod{Q_j}$
IDGHV.Add(pk, $c_1$, $c_2$). Output $c_1 + c_2 \bmod x_0$
IDGHV.Mult(pk, $c_1$, $c_2$). Output $c_1 \cdot c_2 \bmod x_0$

---

The security of the IDGHV scheme is based on the decisional approximate GCD problem (DACD).

4.1 PIE with IDGHV.

Permitted Circuits and Parameters for IDGHV.

Definition 6. Let C be an arithmetic circuit and $\rho' = \max\{\rho + \log(\ell) + \ell_Q, 2\rho + \log(\tau)\}$. C is a permitted circuit if every input being bounded in absolute value by $2^{\rho' + \ell_Q}$ implies the output is bounded in absolute value by $2^{\eta-4}$.

Describing circuits in terms of the multivariate polynomial they compute yields a sufficient condition for determining whether a given circuit is permitted.

Lemma 1. Let C be an arithmetic circuit over the rationals comprised of addition/subtraction and multiplication gates, f be the multivariate polynomial that C computes, and $|f|_1$ be the $\ell_1$ norm of f. If $$\deg(f) < \frac{\eta - 4 - \log(|f|_1)}{\rho' + \ell_Q},$$

then C is a permitted circuit.

One can show that for a circuit with multiplicative depth D, the total degree of the polynomial f computed by the circuit is at most $2^{D-1} + 1 \approx 2^{D-1}$. Further, we note that maximum value of deg(f) is (roughly) inversely proportional to $|Q_i|_{bits} = \ell_Q$, so the multiplicative depth of permitted circuits decreases as the bit size of the $Q_i$ increases.

We assume here that $\log(|f|_1) \ll \eta$, $\rho'$, so it suffices to choose $\ell, \ell_Q$ such that $\mu/(\rho' + \ell_Q)$ is not too small. To this end, suppose we want to support circuits computing a polynomial of degree at most $\delta$. Then we choose $\ell < 2 +$, $\ell_Q = O(\rho)$, and $\eta \geq \rho'\Theta(\delta)$. In particular, we recommend:

$$\ell \ll 2^\rho, \ell_Q \approx \rho, \text{ and } \eta = 3\rho'\delta.$$

PARAMETERS FOR PIE WITH IDGHV. The maximum depth of circuits with which PIE is compatible depends on the size of the message space $\mathcal{G}_M$ relative to the size of the input space $\mathcal{F}_N$ (i.e., how small M is relative to N). This means that fixing M determines the circuits one can evaluate, and fixing the circuits to be evaluated determines M. We give an analytical discussion of the two cases below.

First, we pause to remind the reader of the relevant parameter sizes for IDGHV.

For ciphertexts of the form $c = {}^{CRT} q_0, p_1, \ldots, p_\ell$ $(q, Q_1 r_1 + m_1, \ldots, Q_\ell r_\ell + m_\ell)$, we have $|p_i|_{bits} = \eta$, $|Q_i|_{bits} = \ell_Q$, and $\rho' = \max\{\rho + \log(\ell) + \ell_Q, 2\rho + \log(\tau)\}$.

In the following discussion, $g = \Pi Q_i$, $N = \lfloor \sqrt{(g-1)/2} \rfloor$, and $\mathcal{G}_M$ is the message space, where $M \leq N$.

Choosing circuits first. Given a set of circuits, we must choose d and t so that $\mathcal{P}_{d,t}$ contains the polynomials which the circuits in the set compute. To this end, choose d, t to satisfy lemma 1. That is, $$d < \frac{\eta - 4 - \log(t)}{\rho' + \ell_Q}.$$

We put t=1 for convenience and to maximize the multiplicative depth of permitted circuits, whence the permitted circuits are given by $\mathcal{P}_{d,1}$ for $d \approx (\eta-4)/(\rho' + \ell_Q) - 1$. Rewriting eq. (9) to get a bound on $|M|_{bits}$ and using the above values of d, t we obtain:

$$|M|_{bits} \approx \frac{\ell \ell_Q \rho' + \ell_Q^2}{2(\eta - \rho' - \ell_Q - 4)}. \qquad \text{Eq. 12}$$

Note that t may be chosen much larger, though too large a value may force M to be unreasonably small in order to satisfy eq. (9).

Choosing messages first. M must satisfy eq. (9). Thus, circuits which compute polynomials in $\mathcal{P}_{d,t}$ are permitted as long as $$\frac{\log(t)}{\log(M)} + dt \leq \frac{\log(N)}{\log(M)}.$$

This inequality is satisfied by choosing:

$$t < M \text{ and } d \leq \frac{\log(N) - \log(M)}{M\log(M)}.$$

Thus, we may choose:

$$t = M - 1 \text{ and } d \approx \frac{\ell\ell_Q - 2\log(M)}{2M\log(M)}.$$

Note that this will require the values of $\ell$ and $\ell_Q$ to be quite large. E.g., $M \log(M) \leq \ell\ell_Q$.

Two Encoding Options. There are two ways to combine PIE with IDGHV: using the Chinese Remainder Theorem, and component-wise. The former encodes single rationals, while the latter encodes vectors of rationals. Depending on the application a user can choose one of these two. We elaborate them below.

ENCODING WITH THE CHINESE REMAINDER THEOREM Choose the public parameter $Q_1, \ldots, Q_\ell$ to be distinct odd primes. Let $g = \prod_{i=1}^{\ell} Q_i$, $N = \lfloor \sqrt{(g-1)/2} \rfloor$, and $M \ll N$.

We use the Chinese Remainder Theorem (CRT) to convert the integer output of PIE.Encode to a vector of integers which is the input to IDGHV. We encode and decode with IDGHV as the underlying encryption scheme as follows:

---

IDGHV.Encode. For $m \in \mathcal{G}_M$, output
$(\text{PIE.Encode}(m) \bmod Q_1, \ldots, \text{PIE.Encode}(m) \bmod Q_\ell)$
IDGHV.Decode. For $(h_1, \ldots, h_\ell) \in \mathbb{Z}/Q_1\mathbb{Z} \times \ldots \times \mathbb{Z}/Q_\ell\mathbb{Z}$,
compute
$h = \text{CRT}_{Q_1, \ldots, Q_\ell}(h_1, \ldots, h_\ell)$, then output PIE.Decode(h).

---

Encoding and decoding above are computed with $H_g$ and its inverse.

Choosing M for CRT Encoding. M must be chosen according to eq. (12). That is, $$|M_i|_{bits} \approx \frac{\ell\ell_Q\rho' + \ell_Q^2}{2(\eta - \rho' - \ell_Q - 4)}$$

ENCODING COMPONENT-WISE. Choose the public parameters $Q_1, \ldots, Q_\ell$ to be not-necessarily-distinct primes, and put. Using eq. (9), we obtain $M_i \leq (N_i/t)^{1/dt}$, where d, t are chosen according to lemma 1. The encoding is as follows:

---

IDGHV.Encode. For $(m_1, \ldots, m_\ell) \in \mathcal{G}_{M_1} \times \ldots \times \mathcal{G}_{M_\ell}$,
output $(\text{PIE.Encode}(m_1), \ldots, \text{PIE.Encode}(m_\ell))$
IDGHV.Decode. For $(h_1, \ldots, h_\ell) \in \mathbb{Z}/Q_1\mathbb{Z} \times \ldots \times \mathbb{Z}/Q_\ell\mathbb{Z}$,
output $(\text{PIE.Decode}(h_1), \ldots, \text{PIE.Decode}(h_\ell))$

---

In the component-wise encoding, for each i, PIE.Encode $(h_i)$ and PIE.Decode$(h_i)$ are computed with $Q_i$ as the modulus, i.e., the encoding and decoding functions are $H_{Q_i}$; and the corresponding inverses.

Choosing the $M_i$ for Component-wise Encoding. Since we are encoding with primes $Q_i$ instead of their product, it suffices here to make a minor change to eq. (12). Namely, we put $\ell = 1$. This yields:

$$|M_i|_{bits} \approx \frac{\ell_Q\rho' + \ell_Q^2}{2(\eta - \rho' - \ell_Q - 4)}$$

4.2 IDGHV-Compatible Encoding Parameters and Message Space.

TABLE 1

| $\lambda$ | $\ell$ | $\ell_Q$ | max d | $|M|_{bits}$ | $\gamma$ | $\eta$ | $\rho$ |
|---|---|---|---|---|---|---|---|
| | | | | Size of the elements of the rational message space $\mathcal{G}_M$ along with maximum degree d of compatible polynomials. Parameters chosen according to the recommendations in Section 3.2. Parameters for (the CRT version of) PIE + IDGHV | | | |
| 50 | 6 | 60 | 15 | 10 | $\approx 5.3 \cdot 10^8$ | 4248 | 100 |
| 60 | 8 | 80 | 19 | 13 | $\approx 1.3 \cdot 10^9$ | 6402 | 120 |
| 70 | 10 | 100 | 18 | 23 | $\approx 3 \cdot 10^9$ | 9041 | 140 |

Remark 3. $|M|_{bits}=23$ simply means that the message space is comprised by fractions whose numerators and denominators are up to 23 bits. Note that the co-primality restriction will not apply if M is smaller than every prime factor of $g = \pi Q_i$.

Choosing the $Q_i$ appropriately. We emphasize that PIE may be attached to IDGHV regardless of the choice of the $Q_i$. However, the input space $\mathcal{F}_N$ (of PIE) may be too small to be useful if the number and size of the $Q_i$ are too small. In contrast, note that the $Q_i$ can be small as long as there are "enough" of them. Similarly, if the number of $Q_i$ is small, then their product should be quite large. As an example of the former, if $Q_i=3$ for i=1, \ldots, 5, then the message space of IDGHV is (isomorphic to) $\mathbb{Z}/3^5\mathbb{Z}$. The encoding modulus for PIE is 35=243 which is co-prime with 10, so we can encode certain decimal numbers up to precision 2 such as 1.37=137/100.

We can use parameters to determine the size of each element in the corresponding message space by coupling PIE with IDGHV. Let $Q_1, \ldots, Q_\ell$ be distinct primes—public key elements in IDGHV. For encoding a single message, we take the product of all $Q_i$'s as g and encode the rational message using g. Four different configurations are provided: Toy, Small, Medium, and Large. In the Medium configuration, we have 138 56-bit $Q_i$'s. This gives us a g of roughly 7728 bits with an N of roughly 3864 bits. In the Large configuration, we have 531 71-bit $Q_i$'s. This gives us a g of length roughly 37701 bits with an N of roughly 18850 bits.

A large N resulting from (secure) HE parameters, is very advantageous. For example, if we take $N \approx 218850$ and $M=2^{64}-1$ (that allows fractions with numerators and denominators of up to 64 bits to be encoded), then we can use eq. (9) to find sets of polynomials $\mathcal{P}_{d,t}$ with which PIE is compatible. In this case, we get compatibility with polynomials in $\mathcal{P}_{2^4,2^4}$ (total degree and $\ell_1$-norm at most 24) or with polynomials in $\mathcal{P}_{10,29}$ (total degree at most 10 and $\ell_1$-norm at most 29). These sets of polynomials correspond to arithmetic circuits of (approximate) multiplicative depth 4 and 3, respectively. Of course, if one chooses a smaller M, then the multiplicative depth of compatible circuits increases.

5 PIE with Modified Fan-Vercauteren HE

The modified FV scheme. We give a brief description of a modification of the FV HE scheme that is based on the decisional Ring Learning With Errors (RLWE) problem. The main difference between the modified FV (ModFV) and FV is that the former encrypts integers while the latter encrypts polynomials. In particular, ModFV is obtained from FV by attaching the Hat Encoder. We recall the encoder here.

Definition 7 (Hat Encoder). Let $\|\cdot\|_\infty$ denote the polynomial infinity norm. For $m \in \mathbb{Z}/(b^n+1)\mathbb{Z}$, $b \geq 2$ and $n \geq 1$, let $\hat{m}$ be the polynomial with lowest degree such that $\|\hat{m}\|_\infty \leq (b+1)/2$ and $m(b)=m \bmod b^n+1$. Such a polynomial always exists and has degree at most $n-1$.

Roughly speaking, the Hat encoder takes the base-b expansion of m with coefficients in $Z_{b^n+1}$, and then replaces everywhere b by an unknown x to obtain the polynomial $\hat{m}(x)$.

We are now ready to define ModFV. For n a power of 2 (typically at least 1024), denote the $2n^{th}$ cyclotomic ring of integers by $R=\mathbb{Z}[x]/(x^n+1)$, and let $R_a$ denote the ring obtained by reducing the coefficients of R modulo a. The plaintext space is the ring $\mathcal{M}=\mathbb{Z}_{b^n+1}$, for $b \geq 2$, and the ciphertext space is product ring $R_q \times R_q$ for $q \gg b$. Let $\lambda$ be the security parameter and x be a discrete Gaussian distribution with standard deviation $\sigma$ (typically $\sigma=3.19$).

---

ModFV.SecretKeyGen. Sample $s \in R$ with coefficients uniform in $\{-1, 0, 1\}$.
Output sk = s.
ModFV.PublicKeyGen(sk). Let s = sk. Sample $a \leftarrow R_q$, and $e \leftarrow x$.
Output pk = $([-(as + e)]_q, a) \in R_q \times R_q$.
ModFV.EvalKeyGen(sk). For $i = 0, \ldots, \ell$, where $w \geq 2$ and $\ell = \lfloor \log_w q \rfloor$,
sample $a_i \leftarrow R_q$, and $e_i \leftarrow x$. Put evk[i] = $([-(a_i s + e_i) + w^i s^2]_q, a_i) \in R_q \times R_q$.
Output the vector of pairs evk = (evk[0], . . . , evk[$\ell$]).
ModFV.Enc(pk, $m \in \mathcal{M}$).

Let $\Delta_b = \left\lfloor -\dfrac{q}{b^n+1}\left(x^{n-1} + bx^{n-2} + \ldots + b^{n-1}\right) \right\rfloor$ and pk = $(p_0, p_1)$. Sample $u \in R$ with coefficients uniform in $\{-1, 0, 1\}$, and $e_0, e_1 \leftarrow x$. Let $\hat{m}$ be a hat encoding of m.
Output ct = $([\Delta_b \hat{m} + p_0 u + e_0]_q, [p_1 u + e_1]_q) \in R_q \times R_q$.
ModFV.Dec(sk, ct $\in R_q \times R_q$). Let s = sk and ct = $(c_0, c_1)$.

Let $\hat{M} = \left\lfloor \dfrac{x-b}{q}[c_0 + c_1 s]_q \right\rfloor$.

Output m' = $\hat{M}(b) \in \mathcal{M}$.

---

5.1 PIE with ModFV

We stress that although CLPX uses a function having the same definition as our "H-function", their approach is not based on techniques from p-adic number theory. Consequently, the decode functions and input spaces differ dramatically between CLPX and PIE. A comparison of the input spaces is provided in section 5.2.

In pairing PIE with ModFV, we distinguish two cases: $b^n+1$ prime and $b^n+1$ composite. We note, however, that the definitions of encoding and decoding are identical for both cases. The differences lie in how b and n are chosen, and the resulting input spaces.

Put $N = \lfloor \sqrt{((b^n+1)-1)/2} \rfloor = \lfloor \sqrt{b^n/2} \rfloor$ and let $\mathcal{G}_M$ be as in Eq. (8).

That is, $\mathcal{G}_M$ is the set of reduced fractions x/y satisfying: $|x| \leq M$, $1 \leq |y| \leq M$, and $\gcd(b^n+1, y)=1$. M is chosen to be much smaller than N according to eq. (9) and eq. (14). We define encoding as follows:

---

ModFV.Encode. For $x/y \in \mathcal{G}_M \subseteq \mathcal{F}_N$,
output h = PIE.Encode (x/y) $\in \mathbb{Z}/(b^n + 1)\mathbb{Z}$.
ModFV.Decode. For $h \in \mathbb{Z}/(b^n + 1)\mathbb{Z}$,
output x/y = PIE.Decode (h) $\in \mathcal{F}_N$.

---

$b^n+1$ prime. Note that since $b^n+1$ is prime, the function $H_{b^n+1}$ maps x/y to $xy^{-1} \bmod b^n+1$ (definition 5). Further, since $\gcd(y, b^n+1)=1$ for all $0 < y \leq N$, no fractions are discarded because of the gcd condition in definition 1—i.e., all x/y with $|x|$, $|y| \leq N$ can be encoded.

Choosing b and n for $b^n+1$ a prime. As one might suspect, there are rather few choices for b and n which make $b^n+1$ prime. The known Fermat primes (primes of the form $2^{2^n}+1$) are too small for the parameter requirements of ModFV. In our search for suitable primes, we found OEIS (On-Line Encyclopedia of Integer Sequences) sequence A056993 which lists primes of the form $k^{2^n}+1$. While this sequence does not provide many candidates, this is not a problem since b and n are public parameters. In particular, one can reuse an appropriately-chosen prime $b^n+1$ as needed without compromising security.

$b^n+1$ composite. For a composite $b^n+1$, the mapping $H_{b^n+1}$ is defined by the CRT, which requires (non-trivial) co-prime factors of $b^n+1$ to be known. This could be problematic, as $n \geq 1024$ will make $b^n+1$ very large even for small b. The following lemma addresses this difficulty.

Proposition 9. If g is a positive integer and $x/y \in \mathcal{F}_N$, then $H_g(x/y)=xy^{-1} \bmod g$.

Proof. This is immediate if g is prime, so suppose g is composite with prime factorization $$g = p_1^{r_1} \ldots p_k^{r_k}. \text{ Let } x/y \in \mathcal{F}_N, h_i = H_{p_i^{r_i}}(x/y),$$

and $h=H_g(x/y)$. By definition 5, $$h = CRT_{p_1^{r_1}, \ldots, p_k^{r_k}}(h_1, \ldots, h_k).$$

By the definition of the CRT, h is the unique integer in $\mathcal{Z}_g$ such that $h=h_i \bmod p_i^{r_i}$. Put $h'=xy^{-1} \bmod g$, so $yh'=x \bmod g$. Since each $p_i^{r_i}$ divides g, $yh'=x \bmod p_i^{r_i}$. Multiply both sides of the preceding equation by the inverse of y modulo $p_i^{r_i}$ to get $h'=xy^{-1} \bmod p_i^{r_i}$. But this means that $h'=h_i \bmod p_i^{r_i}$, whence h'=h. This completes the proof.

As noted above, $b^n+1$ may be large enough to make factoring infeasible. In this case, determining the entire input space is also infeasible, because one must enforce the condition: $\gcd(y,b^n+1) \neq 1 \rightarrow x/y \notin \mathcal{F}_N$. This is not a problem however, as we only need a suitable subset of $\mathcal{F}_N$; namely $\mathcal{G}_M$. We note that if y and b have the same prime factors, then $\gcd(y, b^n+1)=1$, whence we can encode x/y as long as every prime factor of y is a factor of b. For example, we may choose $b=p_1 p_2 \ldots p_k$, the product of the first k primes for some $k \geq 1$, meaning we can encode all $x/y \in \mathcal{G}_M$ such that any prime factor of y is one of $p_1, \ldots, p_k$. This approach can certainly give us a sufficiently large set of fractions as the message space of PIE, though this set may not be the entirety of $\mathcal{G}_M$.

We further distinguish the case where b=p is prime, for this allows us to encode certain p-adic non-integers (p-adic numbers with negative valuation). In particular, since p and $p^n+1$ are always co-prime, we can encode rationals of the form $x/p^k$ (k>0) that are contained in $\mathcal{F}_N$.

Compatible Circuits. The performance of ModFV is assessed by evaluating so-called regular (arithmetic) circuits. We directly apply the bounds from their analysis on such circuits to our encoder to FV. A regular circuit is parameterized by non-negative integers A, D, L, and consists of evaluating A levels of additions followed by one level of multiplication, iterated D times, where inputs are integers from [−L, L]. Note that such a circuit has multiplicative depth D. The output c of a regular circuit (satisfies:

$$|c| \le V(A, D, L) = L^{2D} 2^{A(2^D - 1)}. \qquad \text{Eq. 13}$$

We define permitted circuits in essentially the same way as Section 4.1.

Definition 8. For fixed A, D, L, an arithmetic circuit C is a (A, D, L)-permitted circuit if every input being bounded in absolute value by L implies the output is bounded in absolute value by V (A, D, L).

Eq. 13 implies every regular circuit parameterized by A, D, L is an (A, D, L)-permitted circuit. When the context is clear, we will omit "(A, D, L)" and simply write "permitted circuit".

Lemma 2. Fix non-negative integers A, D, L. Let C be an arithmetic circuit, f be the multivariate polynomial that C computes, $|f|_1$ be the $\ell_1$ norm of f, and V=V (A, D, L). If $|f|_1 L^{deg(f)} < V$ or equivalently, $$deg(f) < 2D + \frac{2A(2^D - 1) - \log(|f|_1)}{\log(L)}, \qquad \text{Eq. 14}$$

then C is a permitted circuit.

Proof. Let C be an arithmetic circuit, and f be the k-variate polynomial which C computes. We can express f in the form $\sum_{i=1}^{I} c_i f_i$, where the $f_i$ are monomials and the ci are the coefficients.

For $x \in [−L, L]^k$ and $L=(L, L, \ldots, L) \in \{L\}^k$, we use the triangle inequality and $deg(f_i) \le deg(f)$ to obtain:

$$|f(x)| = \left| \sum_{i=1}^{I} c_i f_i(x) \right| \le \left| \sum_{i=1}^{I} c_i f_i(L) \right| \le \left| \sum_{i=1}^{I} c_i L^{deg(f)} \right| \le |f|_1 L^{deg(f)},$$

The above inequalities yield $|f(x)| \le V$, completing the proof.

To guarantee that PIE works seamlessly with ModFV, we must ensure that the maximum degree of polynomials compatible with ModFV does not exceed the maximum degree of polynomials compatible with PIE. Thus, according to lemma 2 and equation 9, we require:

$$\frac{\log(V) - \log(|f|_1)}{\log(L)} < \frac{\log(N) - \log(t)}{t \log(M)},$$

where f computes an (A, D, L)-permitted circuit, and $\mathcal{P}_{d,t}$ is the set of polynomials with which PIE is compatible. In practice, this inequality is easily satisfied because log(N)/log(M) is quite large and t is chosen to be small.

5.2 PIE vs CLPX: Input Space Advantage.

CLPX adapts the polynomial encoding idea from previous works while addressing the problem of plaintext polynomial coefficient growth. As explained above, to obtain the maximum circuit depth (corresponding to homomorphic computation) for PIE with ModFV we can directly use their analysis. Table 2 shows that when used with PIE scheme, the multiplicative depths of circuits compatible with ModFV are almost the same as when used with CLPX encoding.

TABLE 2

| | | | | Comparison of maximum circuit depth D with ModFV and PIE + ModFV. | | | | | |
| | | $L = 2^8$ | | $L = 2^{16}$ | | $L = 2^{32}$ | | $L = 2^{64}$ | |
| n | $\log_2$ q | b | max D | b | max D | b | max D | b | max D |
| | | | Number of additions A = 0 | | | | | | |
| $2^{14}$ | 435 | 257 | 14 | 257 | 13 | 257 | 12 | 257 | 11 | [4] |
| $2^{15}$ | 890 | $2^{16}$ | 16 | $2^{16}$ | 15 | $2^{32}$ | 15 | $2^{32}$ | 14 | |
| $2^{14}$ | 435 | $2^{16}$ | 11 | $2^{16}$ | 11 | $2^{32}$ | 11 | $2^{32}$ | 11 | Our work |
| $2^{15}$ | 890 | $2^{16}$ | 15 | $2^{16}$ | 14 | $2^{32}$ | 14 | $2^{32}$ | 13 | |
| | | | Number of additions A = 3 | | | | | | |
| $2^{14}$ | 435 | 128 | 13 | $2^{11}$ | 13 | 724 | 12 | 431 | 11 | [4] |
| $2^{15}$ | 890 | $2^{28}$ | 16 | $2^{22}$ | 15 | $2^{19}$ | 14 | $2^{35}$ | 14 | |
| $2^{14}$ | 435 | $2^{16}$ | 10 | $2^{16}$ | 10 | $2^{16}$ | 10 | $2^{16}$ | 10 | Our work |
| $2^{15}$ | 890 | $2^{16}$ | 15 | $2^{16}$ | 14 | $2^{32}$ | 14 | $2^{32}$ | 13 | |

The definition of the CLPX input space $\mathcal{P}$ depends on whether b>2 is even or odd. If b is odd, then $b^n + 1$ is even, which means no fractions with even denominators can be encoded, and, moreover, $b^n + 1$ will not be prime. We consider the odd case to be too restrictive, and, therefore, only compare the input space of PIE with the input space of CLPX when b is even.

Proposition 10. For b even, the cardinality of the input space $\mathcal{P}$ is $$\frac{b^n - 1}{b - 1}.$$

By proposition 5 and eq. (7), when $b^n + 1$ is prime, the cardinality of $\mathcal{F}_N$ is approximately $0.6(b^n + 1)$. Consequently, using proposition 10, we see the cardinality of $\mathcal{F}_N$ is roughly $0.6(b−1)$-times (since $b^n$ is quite large, $$\frac{\mathcal{F}_n}{\mathcal{P}} \approx \frac{0.6(b^n + 1)(b - 1)}{b^n - 1} \approx 0.6(b - 1))$$

the size of $\mathcal{P}$. Thus, our input space is larger when b≥3, and our size advantage is directly proportional to the size of b, as shown in table 3.

TABLE 3

| Comparison of input space sizes for PIE and CLPX when $b^n + 1$ is prime. The values of n are chosen according to the security recommendations for FV. | | | |
| --- | --- | --- | --- |
| b | 150 | 824 | 1534 |
| n | $2^{11}$ | $2^{10}$ | $2^{12}$ |
| PIE ($|\mathcal{F}_N|$) | $0.6(150^{2^{11}} + 1)$ | $0.6(824^{2^{10}} + 1)$ | $0.6(1534^{2^{12}} + 1)$ |
| CLPX ($|\mathcal{P}|$) | $\dfrac{150^{2^{11}} - 1}{149}$ | $\dfrac{824^{2^{10}} - 1}{823}$ | $\dfrac{1534^{2^{12}} - 1}{1533}$ |
| $\dfrac{\text{PIE}}{\text{CLPX}}$ | 86 | 600 | 857 |

TABLE 4

Comparison of input space sizes $\mathcal{F}_N$ (for PIE) and $\mathcal{P}$ (for CLPX) when $b^n + 1$ is composite.

| b | 3 | 5 | 7 | 6 | 30 | 30 | 210 | 210 |
|---|---|---|---|---|----|----|-----|-----|
| n | 12 | 8 | 8 | 16 | 4 | 8 | 4 | 6 |
| PIE | 442765 | 324646 | 4787969 | $\approx 1.7 \times 10^{12}$ | $\approx 487992$ | $\approx 4 \times 10^{11}$ | $\approx 1.2 \times 10^9$ | $\approx 4.4 \times 10^{13}$ |
| CLPX | 265720 | 97656 | 960800 | $\approx 5.6 \times 10^{11}$ | 27931 | $\approx 2.2 \times 10^{10}$ | $\approx 9 \times 10^6$ | $\approx 4.1 \times 10^{11}$ |
| $\dfrac{\text{PIE}}{\text{CLPX}}$ | 1.7 | 3.3 | 5 | 3 | 16.7 | 16.7 | 125 | 111.1 |

For $b^n+1$ composite, our size advantage seems to remain, though it is less clear-cut than the prime case, since our examples use quite small b and n. In table 4, we estimate the size of $\mathcal{F}_N$ by using proposition 5 and the approximation $\Phi(n) \approx 3n^2/\pi^2$. Note that, in practice, the size of b and n will be much larger than the numbers provided in the table, and we cannot speculate to how the relationship between $|\mathcal{F}_N|$ and $|\mathcal{P}|$ varies as b and n become large enough for practical applications.

6 Experimental Results

We implemented PIE (in C++) together with proof-of-concept implementations of IDGHV and ModFV schemes (the FHE part of our implementation is not optimized) using NTL.

Since our encoding does not affect the run time of the underlying HE scheme, we provide benchmark times taken for encoding and decoding only. We estimated the runtime of encoding and decoding using two sets, each containing 10,000 rational numbers. The first set contains rationals with numerator and denominator up to 32 bits and the second set contains rationals with numerator and denominator up to 64 bits. These sets are simply the message space $\mathcal{G}_M = \{x/y \mid |x| \leq M, 0 < y \leq M\}$ for $M = 2^{32}-1$ and $M = 2^{64}-1$, respectively. Runtimes are obtained as the average runtime over all the elements in each set. The results are shown in table 5. All experiments are done on a Mac-Book Pro with Apple M1 Max, 32 GB RAM, 1TB SSD.

Let $p=11$ and $r=3$, so $p^r=1331$ and $N=\lfloor \sqrt{(p^r-1)/2} \rfloor = 25$. Since the above fractions lie in $\mathcal{F}_{25}$, we can encode them as follows:

$$m_1 = H_{1331}(-2/3) = 443,$$

$$m_2 = H_{1331}(-1/2) = 665,$$

$$m_3 = H_{1331}(1/3) = 444.$$

Due to the restriction $\gcd(\text{denominator}, p^r)=1$, many fractions $x/y$ which satisfy $|x|, |y| \leq N$ cannot be encoded. E.g., when $p^r=11^3$, 23/22 cannot be encoded. Of course, this is because the mapping $H_{p^r}$ requires the inverse of the denominator modulo $p^n$, which does not exist when $\gcd$ (denominator, $p^r) \neq 1$.

A.1 Choosing the Encoding Parameters p and r.

Let S be a set of fractions such that:

$$S = \{-13/25, 23/19, 31/5, 17/61, 48/23\}.$$

One can choose a prime that is sufficient for encoding and decoding all fractions by simply checking the largest

TABLE 5

Average encoding and decoding times for various parameters.
Here p is the prime used for encoding and decoding.

| | |p|bits | | | | |
|---|---|---|---|---|---|
| 650 | 650 | 1250 | 1250 | 3200 | 3200 |
| | | |M|bits | | | |
| 32 | 64 | 32 | 64 | 32 | 64 |
| Encode time 0.023833 ms | 0.001958 ms | 0.006584 ms | 0.001708 ms | 0.003916 ms | 0.002375 ms |
| Decode time 0.047792 ms | 0.054791 ms | 0.028625 ms | 0.0475 ms | 0.046625 ms | 0.06175 ms |

Our implementation of encoding and decoding is not optimized for performance. We have used NTL for computing inverse in the encoding function. For the MEEA in decoding, we implemented the (truncated) extended Euclidean algorithm.

A Supplemental: Encodings with Primes and Prime Powers

Assume we want to encode the following fractions:

$$m_1 = -2/3, \quad m_2 = -1/2, \quad m_3 = 1/3. \qquad \text{Eq. 15}$$

numerator or denominator in absolute value and set it as the value of b and then find the right prime p such that:

$$p \geq 2b^2 + 1.$$

The largest quantity in S is 61, so we set $b=61$, which means we need a prime p that satisfies:

$$p \geq 7443.$$

The smallest prime to satisfy the above inequality is 7451 which gives $N=\lfloor\sqrt{(7451-1)/2}\rfloor=61$. That allows us to encode all fractions in S. We emphasize that this process works for any finite set of rationals.

Equivalently, one could choose a small prime which is co-prime with all of the denominators, and then choose an exponent r large enough to allow the fractions to be encoded. For example, p=3 is co-prime with all denominators in S, which means we must choose r large enough so that $3^r \geq 2$ $(61)^2+1=7443$. That is, $$r \geq \log(7443)/\log(3) = 8.1.$$

So $p^r=39$ also suffices to encode the members of S.

However, can we actually do something with it? If we hope to compute over the image of S, we need to choose a prime (power) that allows "room" for including the outputs of the operations we expect to work with. Instead of choosing a prime from strict parameters, a more conservative approach could be to consider the bit length of the largest numerator or denominator and the function one wishes to compute. If this time we let b be the bit-length of the largest numerator or denominator in absolute value and the function be $f(x_1, x_2, \ldots, x_n)=x_1 x_2 \ldots x_n$, then we need a prime that satisfies the following inequality:

$$|p|_{bits} > 2bn + 1.$$

Say that we have n=5. Since 61 is a 6-bit number, we set b=6. We now need a prime such that:

$$|p|_{bits} > 61.$$

We choose p=3693628617552068003, a 62-bit prime which gives us the following encodings of the members of S:

$$h_1 = H_p(-13/25) = 3102648038743737122,$$

$$h_2 = H_p(23/19) = 2138416568056460424,$$

$$h_3 = H_p(31/5) = 2216177170531240808,$$

$$h_4 = H_p(17/61) = 3390872173490423085,$$

$$h_5 = H_p(48/23) = 321185097178440698,$$

and we can check that $$\prod_{i=1}^{5} h_i \bmod p = 2444130464540096986$$

which decodes to $$H_p^{-1}(2444130464540096986) = \frac{-328848}{144875}$$

and matches $$-\frac{13}{25}\cdot\frac{23}{19}\cdot\frac{31}{5}\cdot\frac{17}{61}\cdot\frac{48}{23} = \frac{-328848}{144875}.$$

This example shows the intuition behind Proposition 7 and Definition 8.

B Supplemental: Extending Farey Rationals for Larger Input Space

Extending the set $\mathcal{F}_N$. While the Farey rationals $\mathcal{F}_N$ have a very simple description and are easy to work with, they have a downside: their size. For example, if p=907, then N=21 and the cardinality of $\mathcal{F}_N$ is 559. This means that 907−559=348 integers in $\mathcal{Z}_{907}$ do not have a pre-image (under $H_{907}^{-1}$) in $\mathcal{F}_N$. We address this by extending $\mathcal{F}_N$ to a set $\mathcal{F}_{N,g}$.

Definition 9 (Extended Farey Rationals). For a positive integer g, the extended Farey rationals are defined as the set of reduced fractions:

$$\mathcal{F}_{N,g}\left\{\frac{x}{y} \,\middle|\, \exists\, h \in \mathcal{Z}_g \text{ such that } MEEA(g, h), gcd(g, y) = 1\right\}.$$

Clearly $\mathcal{F}_N \cap \mathcal{F}_{N,g}$. We also note that for all $m \in \mathcal{F}_{N,g}$, $H_g^{-1}(H_g(m))=m$ (generalize proof of Proposition 1(i)). The following lemma provides a necessary, though not sufficient, condition for a rational number to be in $\mathcal{F}_{N,g}$.

Proposition 11. Let g be a positive integer, and $N=\lfloor\sqrt{(g-1)/2}\rfloor$. If $x/y \in \mathcal{F}_{N,g}$, then $|x| \leq N$ and $|y| \leq 2N+1$.

Proof. Let $h \in \mathcal{Z}_g$, and suppose $H_g^{-1}(h)=x/y$. By definition of MEEA, $x/y=x_i/y_i$ for some $x_i$, $y_i$ computed by the EEA. That $|x| \leq N$ is immediate from the definition of $H_g^{-1}$ (i.e., the stopping condition in MEEA). The outputs of the EEA satisfy:

$$|y_k| \leq \frac{x_0}{x_{k-1}},$$

for all k.

By definition, $x_i-1 > N$. Whence, for $N'=\sqrt{(g-1)/2}$, $$|y_i| \leq \frac{g}{x_{i-1}} < \frac{g}{N'} < \frac{2(N')^2+1}{N'}\cdot = 2N' + \frac{1}{N'}$$

It follows that $$|y_i| \leq \left\lfloor 2N' + \frac{1}{N'} \right\rfloor \leq 2N + 1,$$

completing the proof.

This proposition simplifies the process of deciding whether a given reduced rational number x/y is in $\mathcal{F}_{N,g}$:

$$\text{If } |x| \leq N, |y| \leq N, \text{ and } gcd(g, y) = 1, \text{ then } \frac{x}{y} \in \mathcal{F}_N \subset \mathcal{F}_{N,g}. \quad \text{(i)}$$

$$\text{If } |x| > N \text{ or } |y| > 2N+1, \text{ or } gcd(g, y) > 1, \text{ then } \frac{x}{y} \notin \mathcal{F}_{N,g}. \quad \text{(ii)}$$

$$\text{If } |x| \leq N, N < |y| \leq 2N+1, \text{ and } gcd(g, y) = 1, \text{ then } \frac{x}{y} \in \mathcal{F}_{N,g} \quad \text{(iii)}$$

25

26 if and only if $$H_g^{-1}\left(H_g\left(\frac{x}{y}\right)\right) = x/y.$$

Two Options for the Message Space. For a fixed positive integer g, we now have two sets of rationals which can serve as the domain of the encoder:

the Farey rationals $\mathcal{F}_N$, and the extended Farey rationals $\mathcal{F}_{N,g}$.

The advantage of $\mathcal{F}_N$ is its simplicity. $\mathcal{F}_{N,g}$, on the other hand, is larger than $\mathcal{F}_N$ and, when g is prime, has exactly g elements.

Hardware Implementation for an Embodiment (FIG. 1)

FIG. 1 is a block diagram 100 of the hardware implementation for an embodiment. A source computing device 102 is connected over an electronic network/bus connection 108 to an intermediary computing device 104 and a destination device 106. Likewise, the intermediary computing device 104 and destination computing device 106 are, in turn, connected to each other 104, 106 as well as to the source computing device 102 over the electronic network/bus connection 108. The intermediary computing device 104 is optional and if the intermediary computing device 104 is not present, the source computing device 102 is connected over the electronic network/bus connection 108 to the destination computing device 106.

In the embodiment shown in FIG. 1, the source computing device 102 acts as the source of the encrypted data 110 and the source computing device 102 sends the encrypted data 110 over the network/bus connection 108 to the intermediary computing device 104 and/or the destination computing device 106. When the intermediary computing device 104 receives the encrypted data 110 from the source computing device 102, the intermediary computing device 104 may perform homomorphic arithmetic operations (addition, subtraction, and/or multiplication) with at least one additional ciphertext to obtain a result ciphertext 110 that the intermediary computing device 104 may then send over the network/bus connection 108 to the destination computing device 106. The destination computing device 106 may decrypt the received encrypted ciphertext(s) 110 to obtain unencrypted data reflecting either the original integer data value(s) if the ciphertext(s) 110 was the original ciphertext(s) sent by the source computing device 102 or an unencrypted result(s) of the arithmetic operations performed by the intermediary computing device 104 if the received ciphertext(s) 110 is a result ciphertext(s) sent by the intermediary computing device 104 after performing homomorphic arithmetic operations with the original ciphertext(s) and at least one additional ciphertext. The destination device 104 generally acts as a final destination for the encrypted data 110 received from the network/bus connection 106 intended for decryption.

The encrypted data 110 starts at the source computing device as one or more rational numbers (e.g., of the form x/y). An embodiment at the source 102 encodes the rational numbers into corresponding integers as a function of p-adic arithmetic performed on the rational numbers. The p-adic generated integers have homomorphic properties due to the p-adic arithmetic operations and are compatible with a Homomorphic Encryption (HE) system, including existing Fully Homomorphic Encryption (FHE) systems such as AGCD based systems like IDGHV scheme based systems and/or RWLE based systems like ModFV scheme based systems. An embodiment delivers the p-adic generated integer(s) to the Encryption portion of the FHE system 112 running on the source device for encryption of the integer data. The original or result ciphertext(s) 110 received at the destination device 106 is decrypted by the Decryption portion of the FHE system 114 running on the destination computing device 106 into a p-adic compatible integer(s). An embodiment on the destination device 106 decodes the decrypted integer(s) into corresponding rational numbers to obtain the ultimate desired values.

Generally, communications, including concealed/encrypted communications, are bi-directional such that the source 102, intermediary 104, and destination 106 computing devices may change roles as the encrypted data 110 source 102, intermediary 104, and the encrypted data 110 destination 106 as is necessary to accommodate the transfer of data back and forth between the computing devices 102, 104, 106. Notably, the intermediary computing device 104 does not require knowledge of the secret keys to perform the homomorphic arithmetic operations, so it is likely that the intermediary computing device 104 will be at least computationally isolated from the source 102 and destination 106 computing devices. Additionally, while the computing devices 102, 104, 106 are depicted as separate devices in FIG. 1, the functionality of the source computing device 102, the intermediary 104 and the destination device 106 may be shared on a single computing system/device or among two or more computing devices as it is often desirable to conceal data when transferring data between components of a single device.

Further, as shown in FIG. 1, the source 102 and destination 106 computing devices appear to be laptop computers and the intermediary computing device appears as a "cloud" that may represent one or several devices connected on the network 108 performing homomorphic arithmetic computations without a need to decrypt to the data 110 to obtain the correct decrypted value for the arithmetic operations. Generally, any computing device capable of communication over any form of electronic network or bus communication platform 106 may be one or more of the source 102, the intermediary 104, and destination 106 computing devices. Additionally, the source 102, intermediary 104 and/or destination 106 computing devices may actually be the same physical computing device communicating over an internal bus connection 108 with itself, but still desiring to encrypt transferred data to ensure that an attacker cannot monitor the internal communications bus 108 to obtain sensitive data communications in an unencrypted format.

Various embodiments may implement the network/bus communications channel 108 using any communications channel 108 capable of transferring electronic data between the source 102, intermediary 104, and destination 106 computing devices. For instance, the network/bus communication connection 108 may be an Internet connection routed over one or more different communications channels during transmission between the source 102, intermediary 104, and destination 106 devices. Likewise, the network/bus communication connection 108 may be an internal communications bus of a computing device, or even the internal bus of a processing or memory storage Integrated Circuit (IC) chip, such as a memory chip or a Central Processing Unit (CPU) chip. The network/bus communication channel 108 may utilize any medium capable of transmitting electronic data communications, including, but not limited to: wired communications, wireless electro-magnetic communications, fiber-optic cable communications, light/laser communications, sonic/sound communications, etc., and any combination thereof of the various communication channels.

The various embodiments may provide the control and management functions detailed herein via an application operating on the source 102, intermediary 104, and/or destination 106 computing devices. The source 102, intermediary 104, and/or destination 106 computing devices may each be a computer or computer system, or any other electronic devices capable of performing the communications and computations of an embodiment. The source 102, intermediary 104, and/or destination 106 devices may include, but are not limited to: a general-purpose computer, a laptop/portable computer, a tablet device, a smart phone, an industrial control computer, a data storage system controller, a CPU, a Graphical Processing Unit (GPU), an Application Specific Integrated Circuit (ASIC), and/or a Field Programmable Gate Array (FPGA). Notably, the first 102, second 104, and/or third 106 computing devices may be the storage controller of a data storage media (e.g., the controller for a hard disk drive) such that data delivered to/from the data storage media is always encrypted so as to limit the ability of an attacker to ever have access to unencrypted data. Embodiments may be provided as a computer program product which may include a computer-readable, or machine-readable, medium having stored thereon instructions which may be used to program/operate a computer (or other electronic devices) or computer system to perform a process or processes in accordance with the various embodiments. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

Operational Flow Chart for an Embodiment (FIG. 2)

FIG. 2 is a flow chart 200 of operations for an embodiment. At process 208, the source computing device 202 encodes at least one rational number (e.g., x/y) into at least one corresponding HE compatible integer using p-adic arithmetic that provides the homomorphic capabilities of the p-adic generated integers. At process 210, the FHE system running on the source computing device 202 encrypts the at least one HE compatible integer into at least one ciphertext. At process 212, the source computing device 202 sends the at least one ciphertext to the destination computing device 206 if no homomorphic calculations are desired, or to the intermediary computing device 204 if homomorphic calculations are desired.

The processes 214-216 of the intermediary computing device 204 are not necessary if it is not desired to perform homomorphic calculations with at least one additional ciphertext to obtain a result ciphertext, in which case the original at least one ciphertext may simply be sent to the destination computing device 206 for decryption. Assuming homomorphic calculation operations are desired, at process 214, the intermediary computing device 204 homomorphically computes at least one arithmetic function with the at least one ciphertext and at least one additional ciphertext in accord with to obtain at least one result ciphertext. The potential arithmetic functions are one or more of addition, subtraction, and multiplication. Notably, the intermediary computing device 204 does not have knowledge to be able to decrypt any ciphertext meaning the arithmetic functions performed in process 214 at the intermediary computing device are performed homomorphically with encrypted data. Process 214 performs the necessary operations to perform homomorphic calculations on encrypted data. At process 216, the intermediary computing device 204 sends the at least one result ciphertext to the destination computing device 206.

At process 218, the destination computing device 206 decrypts the at least one ciphertext or the at least one result ciphertext into at least one unencrypted p-adic compatible integer value in accord with the FHE system running on the destination computer 206. At process 220, the destination computing device 206 decodes the integer/result integer into at least one corresponding rational number (e.g., x/y)/result rational number (e.g., $x^r/y^r$) using inverse p-adic arithmetic.

The FHE system running on the source device 202 and the destination device should be of the same type. The various p-adic rational number to integer encoding/decoding embodiments are compatible with both AGCD based FHE systems like IDGHV scheme based systems and/or RWLE based FHE systems like ModFV scheme based systems. For the AGCD based FHE system (e.g., IDGHV), the at least one rational number may be a single rational number. In the case of the single rational number for the AGCD based FHE system, the p-adic encoding of the various embodiments further encodes the single rational number as a function of the Chinese Remainder Theorem (CRT) algorithms. For the AGCD based FHE system, when the at least one rational number is a multivariate vector of rational number, the p-adic encoding of the at least one rational number is performed component wise of the multivariate vector of rational numbers. For the RWLE based FHE system (e.g., ModFV), a mapping parameter $b^n+1$ of the p-adic arithmetic has number base b and power n chosen such that the mapping parameter $b^n+1$ is prime. Alternatively, for the RWLE base THE system, the mapping parameter $b^{n+1}$ of the p-adic arithmetic may have number base b and power n chosen such that the mapping parameter $b_n+1$ is not prime, but that has co-prime factors of mapping parameter $b^n+1$ and mapping of the p-adic arithmetic is also defined by the Chinese Remainder Theorem (CRT) algorithms.

Additionally, while the flow charts and flow chart details described above with respect to FIG. 2 describe a methodology that may be embodied as a method or process, another embodiment may be recognized as a computer system, and/or as an intermediary computing device that stores and/or performs homomorphic operations of encrypted data by implementing the processes described above with respect to the flow chart and flow chart details of FIG. 2. Further, in describing the computing system, and/or the intermediary computing system, one, or more, individual processes described above for the methodology may be broken down and represented as a subsystem of the overall encryption computer system. A subsystem of the computer system, in whole or in part, may be assigned to a particular hardware implemented system, such as a dedicated Application Specific Integrated Circuit (ASIC) or Field Programmable Gate Array (FPGA). One or more subsystems, in whole or in part, may alternatively be implemented as software or firmware instructions defining the operation of a computer system with specific regard to the one or more subsystems implemented as software or firmware instructions. The software or firmware instructions may cause the Central Processing Unit, memory, and/or other systems of a computer system to operate in particular accordance with the particular one or more subsystems designated features.

The foregoing description of the invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated.

What is claimed is:

1. A method for Homomorphic Encryption (HE) compatible encoding and decoding of rational data for encrypted data transmission with a Fully Homomorphic Encryption (FHE) system between a source computing device and a destination computing device, the method comprising:

encoding by said source computing device at least one rational number x/y into at least one integer corresponding to said at least one rational number x/y as a function of p-adic arithmetic performed on each of said at least one rational number x/y such that said at least one integer retains homomorphic properties;

encrypting by said source computing device said at least one integer into at least one ciphertext with said FHE system operating on said source computing device;

sending by said source computing device said at least one ciphertext to said destination computing device;

decrypting by said destination computing device said at least one ciphertext into said at least one integer with said FHE system operating on said destination computing device; and decoding by said destination computing device said at least one integer into said at least one rational number x/y corresponding to said at least one integer as a function of inverse p-adic arithmetic performed on each of said at least one integer.

2. The method of claim 1:

wherein said process of sending by said source computing device said at least one ciphertext to said destination computing device instead sends said at least one ciphertext to an intermediary computing device;

wherein the method of claim 1 further comprises:

homomorphically computing by said intermediary computing device at least one arithmetic function with said at least one ciphertext and at least one additional ciphertext to obtain at least one result ciphertext; and sending by said intermediary computing device said at least one result ciphertext in place of said at least one ciphertext to said destination computing device;

wherein said process of decrypting by said destination computing device said at least one ciphertext into said at least one integer instead decrypts said at least one result ciphertext into at least one result integer; and wherein said process of decoding by said destination computing device said at least one integer into said at least one rational number x/y instead decrypts said at least one result integer into at least one result rational number $x_r/y_r$ such that said at least one result rational number $x_r/y_r$ equals an unencrypted computation of said arithmetic functions of unencrypted forms of said at least one ciphertext and said at least one additional ciphertext.

3. The method of claim 2 wherein said at least one arithmetic function is at least one of a group of arithmetic functions chosen from: addition, subtraction, and multiplication.

4. The method of claim 1 wherein said FHE system is an Approximate Greatest Common Devisor (AGCD) based FHE system.

5. The method of claim 4 wherein said AGCD based FHE system is further based on an Integer—Dijk, Gentry, Halevi, and Vaikuntanathan (IDGHV) scheme.

6. The method of claim 4:

wherein said at least one rational number x/y is a single rational number x/y; and wherein said process of encoding said at least one rational number x/y into at least one integer corresponding to said at least one rational number x/y as a function of p-adic arithmetic further encodes said at least one rational number x/y as a function of Chinese Remainder Theorem (CRT) algorithms.

7. The method of claim 4:

wherein said at least one rational number x/y is a multivariate vector of rational numbers x/y;

wherein said process of encoding said at least one rational number x/y into at least one integer corresponding to said at least one rational number x/y as a function of p-adic arithmetic further encodes said at least one rational number x/y component-wise of said multivariate vector of rational numbers x/y.

8. The method of claim 1 wherein said FHE system is a Ring Learning With Error (RLWE) based FHE system.

9. The method of claim 8 wherein said RWLE based FHE system is further based on a Fan and Vercauteren (FV) scheme modified for encrypting integers (ModFV).

10. The method of claim 8 wherein a mapping parameter $b^n+1$ of said p-adic arithmetic has number base b and power n chosen such that said mapping parameter $b^n+1$ is prime.

11. The method of claim 8 wherein a mapping parameter $b^n+1$ of said p-adic arithmetic has number base b and power n chosen such that said mapping parameter $b^n+1$ is not prime, but that has co-prime factors of mapping parameter $b^n+1$ and mapping of said p-adic arithmetic is defined by Chinese Remainder Theorem (CRT) algorithms.

12. A PIE (p-adic encoding) system that encodes and decodes rational data with Homomorphic Encryption (HE) compatibility for encrypted data transmission with a Fully Homomorphic Encryption (FHE) system between a source computing device and a destination computing device, the PIE system comprising:

said source computing device, wherein said source device further comprises:

a PIE encode subsystem that encodes at least one rational number x/y into at least one integer corresponding to said at least one rational number x/y as a function of p-adic arithmetic performed on each of said at least one rational number x/y such that said at least one integer has homomorphic properties and is HE compatible;

said FHE system operating on said source computing device that encrypts said at least one integer into at least one ciphertext;

a ciphertext send subsystem that sends said at least one ciphertext to said destination computing device;

said destination computing device, wherein said destination computing device further comprises:

said FHE system operating on said destination computing device that decrypts said at least one ciphertext into said at least one integer; and a PIE decode subsystem that decodes said at least one integer into said at least one rational number x/y corresponding to said at least one integer as a function of inverse p-adic arithmetic performed on each of said at least one integer.

13. The PIE system of claim 12:

wherein said ciphertext send subsystem that sends said at least one ciphertext to said destination computing device instead sends said at least one ciphertext to an intermediary computing device;

said intermediary computing device, wherein said intermediary computing device further comprises:

a homomorphic computation subsystem that homomorphically computes at least one arithmetic function with said at least one ciphertext and at least one additional ciphertext to obtain at least one result ciphertext; and an intermediary ciphertext send subsystem that sends said at least one result ciphertext in place of said at least one ciphertext to said destination computing device;

wherein said FHE system operating on said destination computing device that decrypts said at least one ciphertext into said at least one integer instead decrypts said at least one result ciphertext into at least one result integer; and wherein said PIE decode subsystem that decodes said at least one integer into said at least one rational number x/y instead decrypts said at least one result integer into at least one result rational number $x_r/y_r$ such that said at least one result rational number $x_r/y_r$ equals an unencrypted computation of said arithmetic functions of unencrypted forms of said at least one ciphertext and said at least one additional ciphertext.

14. The PIE system of claim 13 wherein said at least one arithmetic function is at least one of a group of arithmetic functions chosen from: addition, subtraction, and multiplication.

15. The PIE system of claim 12 wherein said FHE system is an Approximate Greatest Common Devisor (AGCD) based FHE system.

16. The PIE system of claim 15 wherein said AGCD based FHE system is further based on an Integer—Dijk, Gentry, Halevi, and Vaikuntanathan (IDGHV) scheme.

17. The PIE system of claim 15:

wherein said at least one rational number x/y is a single rational number x/y; and wherein said PIE encode subsystem further encodes said at least one rational number x/y as a function of Chinese Remainder Theorem (CRT) algorithms.

18. The PIE system of claim 15:

wherein said at least one rational number x/y is a multivariate vector of rational numbers x/y;

wherein said PIE encode subsystem further encodes said at least one rational number x/y component-wise of said multivariate vector of rational numbers x/y.

19. The PIE system of claim 12 wherein said FHE system is a Ring Learning With Error (RLWE) based FHE system.

20. The PIE system of claim 19 wherein said RWLE based FHE system is further based on a Fan and Vercauteren (FV) scheme modified for encrypting integers (ModFV).

21. The PIE system of claim 19 wherein a mapping parameter $b^n+1$ of said p-adic arithmetic has number base b and power n chosen such that said mapping parameter $b^n+1$ is prime.

22. The PIE system of claim 19 wherein a mapping parameter $b^n+1$ of said p-adic arithmetic has number base b and power n chosen such that said mapping parameter $b^n+1$ is not prime, but that has co-prime factors of mapping parameter $b^n+1$ and mapping of said p-adic arithmetic is defined by Chinese Remainder Theorem (CRT) algorithms.

\*    \*    \*    \*    \*